(12) United States Patent
Raghavan et al.

(10) Patent No.: US 12,362,839 B2
(45) Date of Patent: Jul. 15, 2025

(54) ONLINE CALIBRATION WITH PHASE OR SIGNAL STRENGTH MEASUREMENTS

(71) Applicant: QUALCOMM Incorporated, San Diego, CA (US)

(72) Inventors: Vasanthan Raghavan, West Windsor Township, NJ (US); Kobi Ravid, Closter, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 18/050,321

(22) Filed: Oct. 27, 2022

(65) Prior Publication Data

US 2024/0154705 A1  May 9, 2024

(51) Int. Cl.
*H04B 17/00* (2015.01)
*H04B 17/11* (2015.01)

(52) U.S. Cl.
CPC .................................. *H04B 17/11* (2015.01)

(58) Field of Classification Search
CPC ........ H04B 17/00; H04B 17/11; H04B 17/21; H04B 17/22; H04B 17/24
See application file for complete search history.

(56) References Cited

U.S. PATENT DOCUMENTS

| 10,644,812 | B2 | 5/2020 | Yoo et al. | |
| 10,979,193 | B2* | 4/2021 | Liu | H04B 7/0417 |
| 12,101,145 | B2* | 9/2024 | Hadani | H04B 17/12 |
| 2007/0206504 | A1 | 9/2007 | Koo et al. | |
| 2014/0226511 | A1* | 8/2014 | Gotman | H04L 1/20 370/252 |
| 2019/0349098 | A1 | 11/2019 | Jiang et al. | |

OTHER PUBLICATIONS

International Search Report and Written Opinion—PCT/US2023/034927—ISA/EPO—Feb. 8, 2024.

* cited by examiner

*Primary Examiner* — Tuan Pham
(74) *Attorney, Agent, or Firm* — Procopio, Cory, Hargreaves & Savitch LLP

(57) ABSTRACT

A first wireless device and a second device may negotiate a configuration of an RF chain calibration process with each other. The configuration of the RF chain calibration process may include a number of calibration rounds. The second wireless device may exchange, in each calibration round in the number of calibration rounds, at least one RS and at least one feedback message with the first wireless device. The second wireless device may identify one or more calibration adjustment parameters for the second wireless device based on the RF chain calibration process. The second wireless device may communicate with another wireless device based on the one or more calibration adjustment parameters.

30 Claims, 12 Drawing Sheets

ONLINE CALIBRATION WITH PHASE OR SIGNAL STRENGTH MEASUREMENTS

TECHNICAL FIELD

The present disclosure relates generally to communication systems, and more particularly, to calibration of a radio frequency (RF) chain in a wireless device with phase or signal strength measurement capabilities.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a first wireless device. The apparatus may negotiate a configuration of a radio frequency (RF) chain calibration process with a second wireless device. The configuration of the RF chain calibration process may include a number of calibration rounds. The apparatus may exchange, in each calibration round in the number of calibration rounds, at least one RS and at least one feedback message with the second wireless device based on the configuration of the RF chain calibration process.

In an aspect of the disclosure, a method, a computer-readable medium, and an apparatus are provided. The apparatus may be a second wireless device. The apparatus may negotiate a configuration of an RF chain calibration process with a first wireless device. The configuration of the RF chain calibration process may include a number of calibration rounds. The apparatus may exchange, in each calibration round in the number of calibration rounds, at least one RS and at least one feedback message with the first wireless device. The apparatus may identify one or more calibration adjustment parameters for the second wireless device based on the RF chain calibration process. The apparatus may communicate with another wireless device based on the one or more calibration adjustment parameters.

To the accomplishment of the foregoing and related ends, the one or more aspects comprise the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
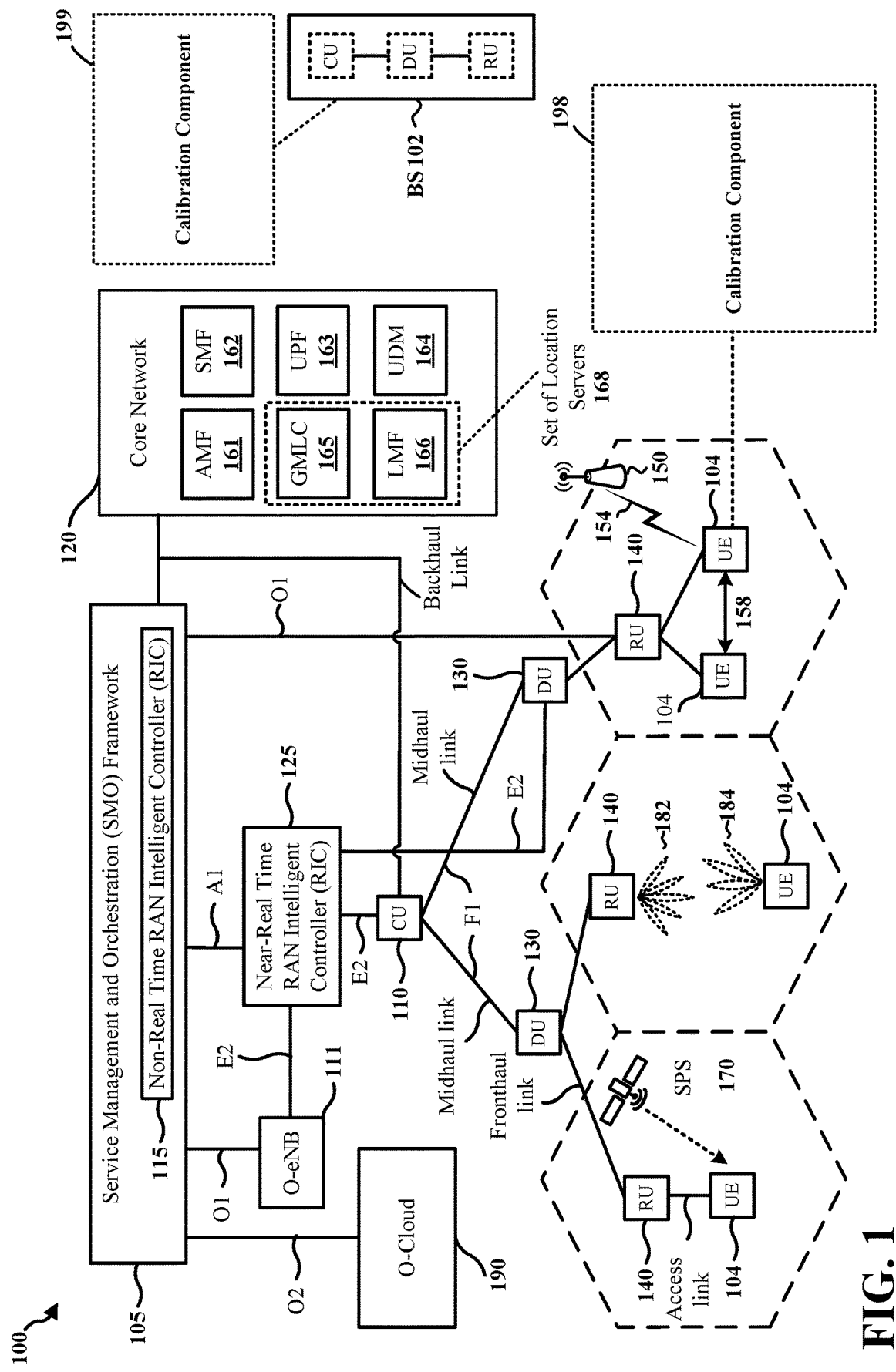
FIG. 1 is a diagram illustrating an example of a wireless communications system and an access network.

For millimeter wave (mmW) communications and for communications at carrier frequencies beyond mmW, beamforming may be used to coherently combine energy and overcome the high path losses at these frequencies. Accordingly, beamforming weights may be computed for signaling. For example, beamforming weights may be computed at the UE antennas in the reception (RX) mode. However, the same weights may not be reused for transmission (TX) from the UE antennas because the RF pathways (circuitry) may be different for TX and RX (e.g., different sets of amplifiers, mixers, couplers, filters, digital-to-analog converters (DACs), analog-to-digital-converters (ADCs), etc., may be used in TX and RX modes).

Calibrating each antenna and each chip for transmit and receive modes separately in a pre-mission mode operation may be expensive (and impractical) because the number of test settings for the calibration may be overly large. In general, typical test settings may include temperature variations, frequency variations, and different power/amplitude levels, etc. Therefore, for example, a typical FR2 chip may have more than 20 amplitude levels. If the supported frequency is 4 GHz and the sampling is per 100 MHz (i.e., one sample per 100 MHz), there may be at least 40 (4G/100M) sampling points in the frequency domain to cover the bandwidth of interest. Accordingly, the total number of sampling points for the testing may be in the hundreds (which may be an overly large number).

According to one or more aspects of the disclosure, a first wireless device and a second device may negotiate a configuration of an RF chain calibration process with each other. The configuration of the RF chain calibration process may include a number of calibration rounds. The second wireless device may exchange, in each calibration round in the number of calibration rounds, at least one RS and at least one feedback message with the first wireless device. The second wireless device may identify one or more calibration adjustment parameters for the second wireless device based on the RF chain calibration process. The second wireless device may communicate with another wireless device based on the one or more calibration adjustment parameters. Therefore, accurate online calibration may be performed for individual devices in the mission mode to support the performance of beamformed transmissions.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit— User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base stations 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6

GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a transmit reception point (TRP), network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the serving base station 102. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 (e.g., a second wireless device) may include a calibration component 198 that may be configured to negotiate a configuration of an RF chain calibration process with a first wireless device. The configuration of the RF chain calibration process may include a number of calibration rounds. The calibration component 198 may be configured to exchange, in each calibration round in the number of calibration rounds, at least one RS and at least one feedback message with the first wireless device. The calibration component 198 may be configured to identify one or more calibration adjustment parameters for the second wireless device based on the RF chain calibration process. The calibration component 198 may be configured to communicate with another wireless device based on the one or more calibration adjustment parameters. In certain aspects, the base station 102 (e.g., a first wireless device) may include a calibration component 199 that may be configured to negotiate a configuration of an RF chain calibration process with a second wireless device. The configuration of the RF chain calibration process may include a number of calibration rounds. The calibration component 199 may be configured to exchange, in each calibration round in the number of calibration rounds, at least one RS and at least one feedback message with the second wireless device based on the configuration of the RF chain calibration process. Although the following description may be focused on 5G NR, the concepts described herein may be applicable to other similar areas, such as LTE, LTE-A, CDMA, GSM, and other wireless technologies.

Figure 2:
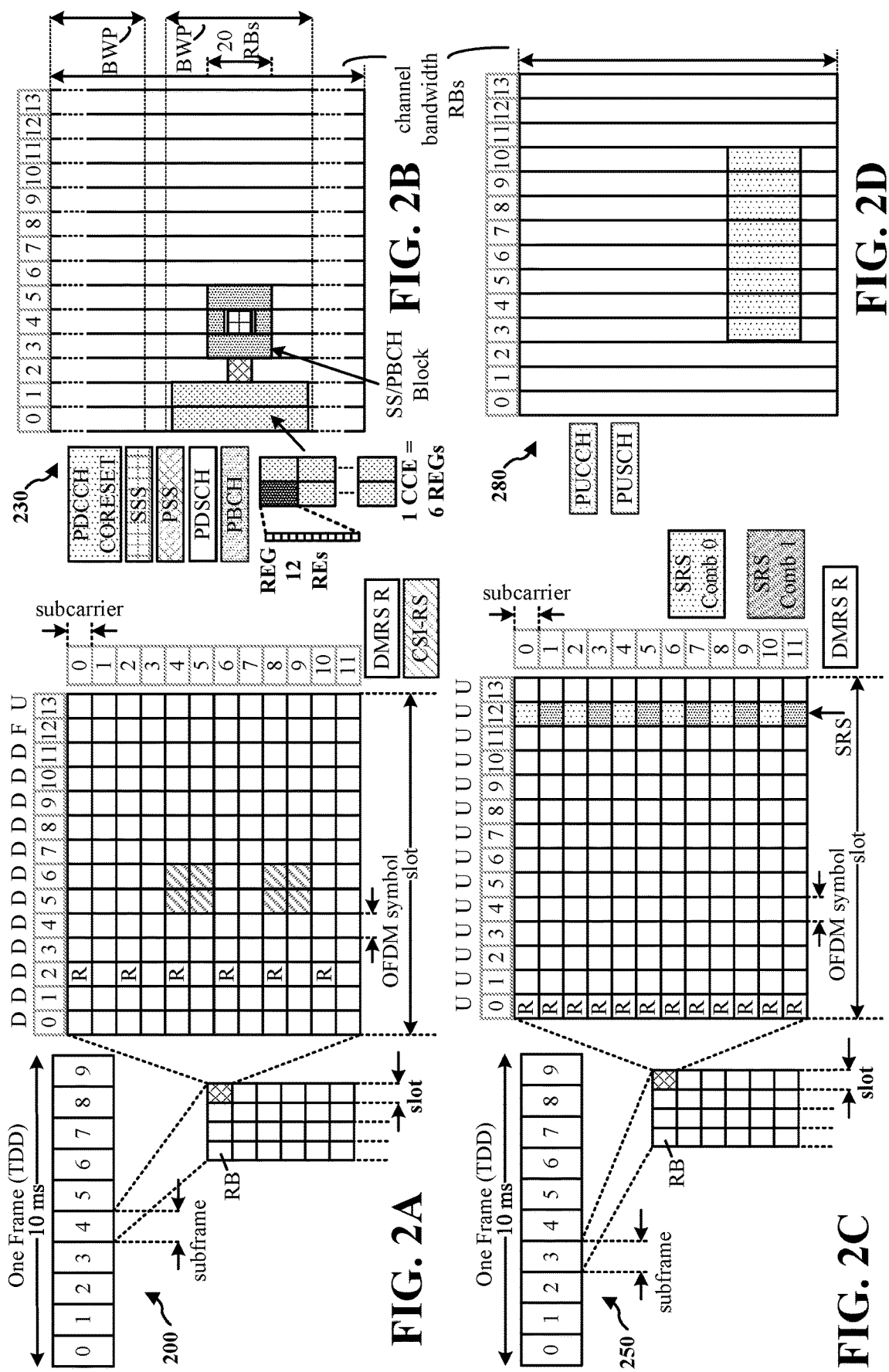
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIB s), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
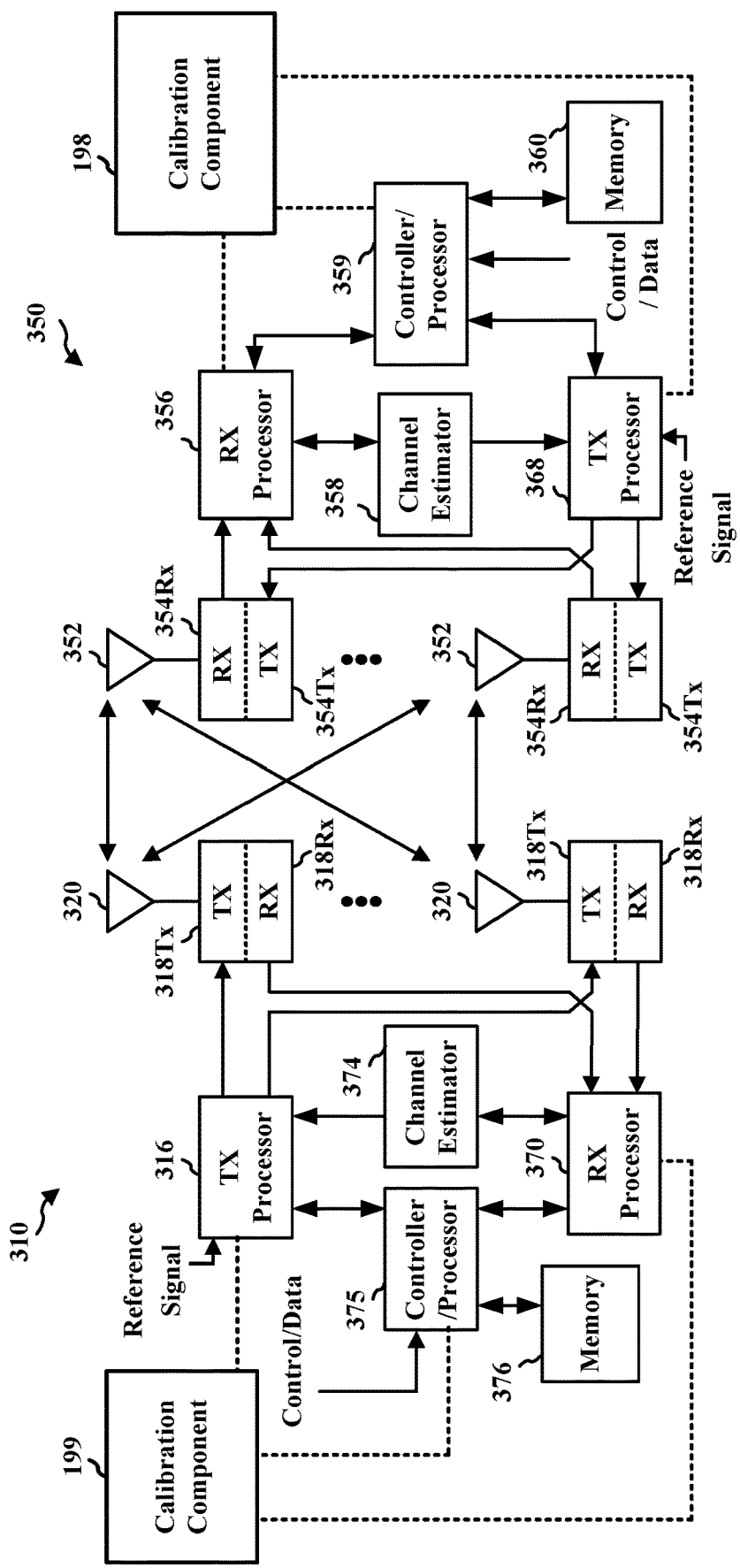
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the calibration component 198 of FIG. 1.

At least one of the TX processor 316, the RX processor 370, and the controller/processor 375 may be configured to perform aspects in connection with the calibration component 199 of FIG. 1.

For mmW communications and for communications at carrier frequencies beyond mmW, beamforming may be used to coherently combine energy and overcome the high path losses at these frequencies. Accordingly, beamforming weights may be computed for signaling. For example, beamforming weights may be computed at the UE antennas in the RX mode. However, the same weights may not be reused for TX from the UE antennas because the RF pathways (circuitry) may be different for TX and RX (e.g., different sets of amplifiers, mixers, couplers, filters, DACs, ADCs, etc., in TX and RX modes).

Newer classes of devices may become available as FR2 (and beyond) systems evolve. Examples of the devices may include intelligent reflective surface (IRS) nodes, repeaters, reflector arrays, and so on. Such devices may be widely used in beyond-FR2 bands such as FR2-2 (FR2X), FR4, FR5, etc., as well as FR3. For a number of reasons, perfect calibration may not be expected at one end or both ends of a link. For example, the reasons may include frequency changes, amplitude/signal strength changes, or temperature changes, etc. Accordingly, online calibration may be an important technique to be used in these new classes of devices.

In some devices, it may be easier to obtain signal strength measurements (e.g., reference signal received power (RSRP) measurements) than phase estimates (phase measurements) of the channel impulse response (CIR). In different aspects, online calibration may be performed with or without obtaining phase measurements. In some configurations where phase measurements are not available, signal strength measurements may be used for the online calibration process. An online calibration process may involve at least two devices. Based on the capability available at one or both of the devices (e.g., phase measurements or signal strength measurements) and whether one or both of the devices are uncalibrated (prior to the online calibration process), different numbers of RSs may be used for the online calibration.

Calibrating each antenna and each chip for transmit and receive modes separately in a pre-mission mode operation may be expensive (and impractical) because the number of test settings for the calibration may be overly large. In general, typical test settings may include temperature variations, frequency variations, and different power/amplitude levels, etc. Therefore, for example, a typical FR2 chip may have more than 20 amplitude levels. If the supported frequency is 4 GHz and the sampling is per 100 MHz (e.g., one sample per 100 MHz), there may be at least 40 (4G/100M) sampling points in the frequency domain to cover the bandwidth of interest. Accordingly, the total number of sampling points for the testing may be in the hundreds (which may be an overly large number).

In another approach, the calibration adjustment parameters may be determined for a sample test equipment representative of a device class in a calibration chamber for one subset of test settings. The adjustment parameters may then be reused across all UEs of the class based on preconfigured adjustment operations applied to the entire set of test settings. This approach may be sub-optimal because the calibration is not performed for each individual device and performance is based on interpolation (e.g., sample and hold, linear interpolation, etc.), which may or may not be satisfactory.

In analog or hybrid beamforming, the phase relationship observed across different antenna elements in an antenna group may be estimated. In one or more configurations, the online calibration may include the estimation of the phase relationships observed across different antenna elements in an antenna group. In one configuration, to estimate the inter-antenna element phase relationships, a known set of RSs transmitted by a first device (e.g., a network node) may be used. In general, if a second device (e.g., a UE) is capable of estimating the phase response, the second device may estimate the phase relationships across an N-element antenna array using N RSs.

Some devices may not be capable of estimating phase responses accurately because implementing such a capability may be expensive and complicated. In particular, more capable hardware may be used for stable estimation of phases. However, by using more RSs (e.g., (3N−2) RSs instead of N RSs), a second device (e.g., a UE) that is capable of estimating the signal strength response accurately but not the phase response may still be able to estimate the phase relationships across an N-element antenna array based on the larger number of RSs and the capability to estimate the signal strength response. It should be appreciated that the use of (3N−2) RSs for phase estimation via signal strength measurements is an illustrative example and does not limit the disclosure.

Figure 4:
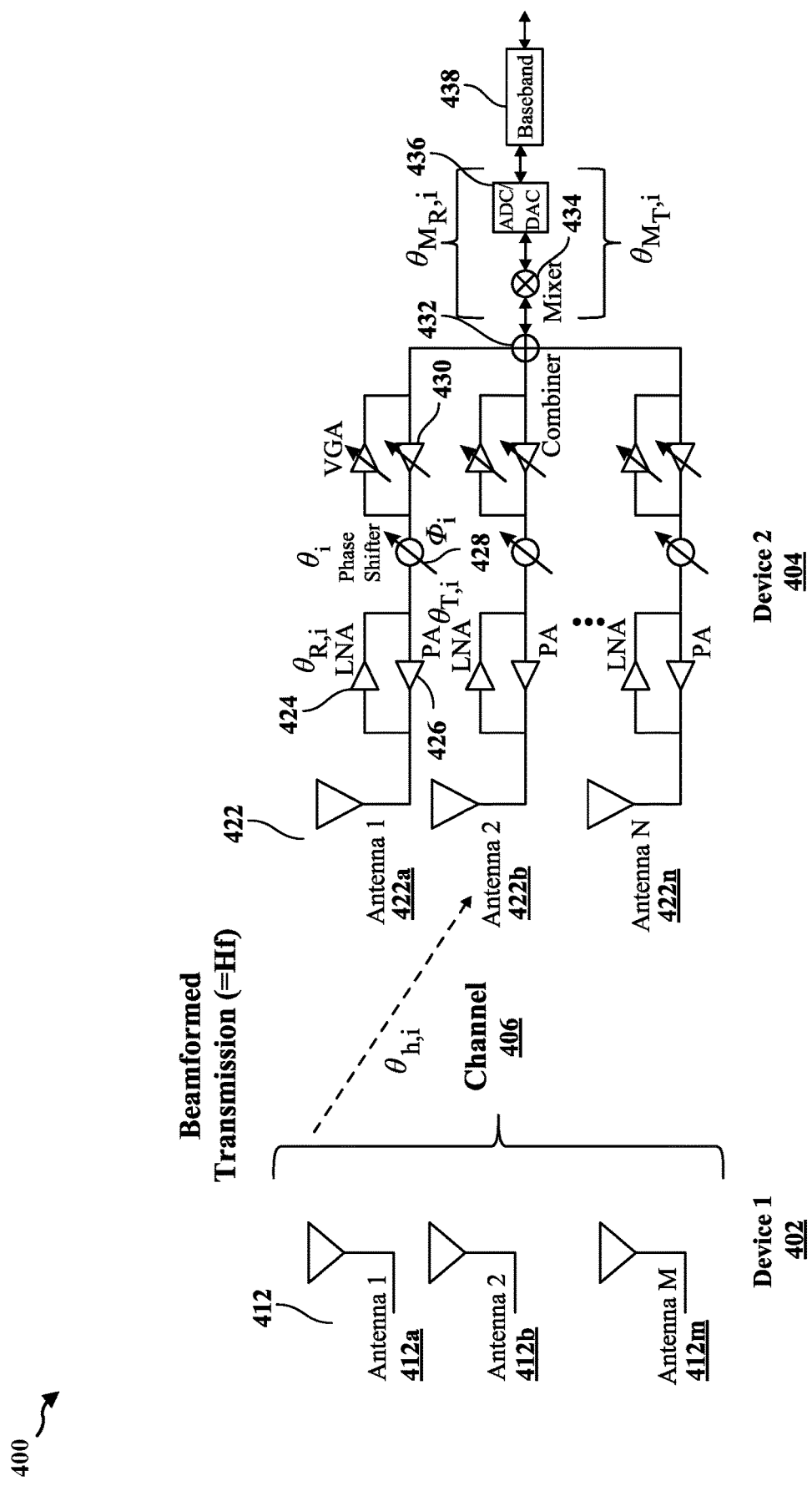
FIG. 4 is a diagram illustrating an example environment in which aspects of the disclosure may be practiced.

FIG. 4 is a diagram 400 illustrating an example environment in which aspects of the disclosure may be practiced. The first device (or Device 1) 402 may include an M-antenna element antenna array 412 including antenna elements 412a, 412b, . . . , 412m. Further, the second device (or Device 2) 404 may include an N-antenna element antenna array 422 including antenna elements 422a, 422b, . . . , 422n. Each antenna element (e.g., each of 422a, 422b, . . . , 422n) may be coupled to a low noise amplifier (LNA) 424 (e.g., for RX), a power amplifier (PA) 426 (e.g., for TX), a phase shifter 428, and one or more variable gain amplifiers (VGAs) 430 (e.g., one for RX and one for TX). Moreover, the RF chain of the second device 404 may include a combiner 432, a mixer 434, an ADC/DAC 436, and a baseband 438. The model shown in FIG. 4 may assume noise-free reception: For a transmission from the first device 402 to the second device 404 over the channel matrix H 406, a beamforming vector f may be used at the first device 402 and a beamforming vector g may be used at the second device 404 to produce the scalar output $y = g^H H f$.

In some configurations, both the first device 402 and the second device 404 may be uncalibrated (prior to online calibration). In some other configurations, the second device 404 may be uncalibrated and the first device 402 may be (pre-)calibrated (e.g., the first device 402 may be a pre-calibrated "golden" device). In different configurations, one or both of the first device 402 and the second device 404 may be calibrated in the mission-mode (run-time operations) via an online calibration procedure.

Figure 5:
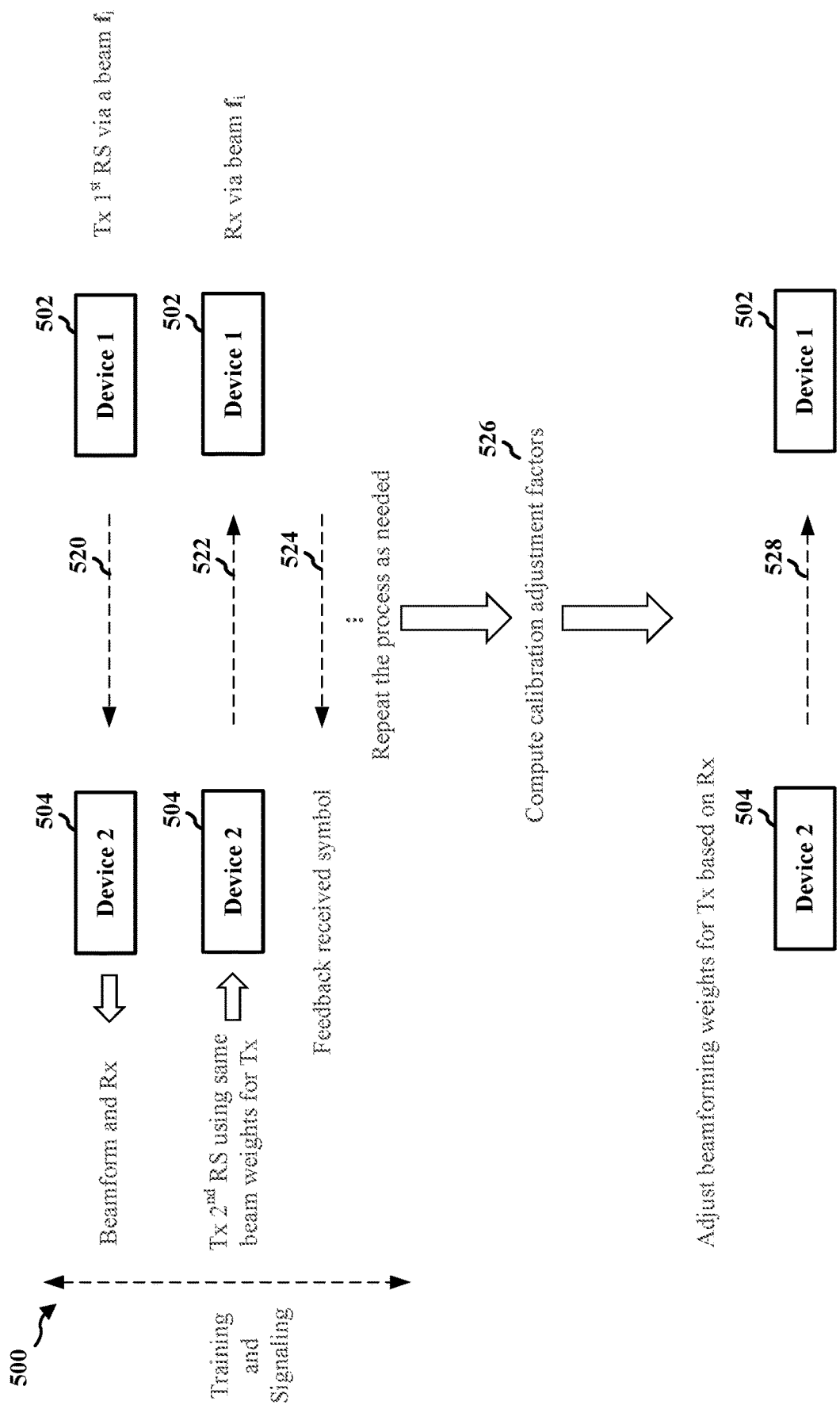
FIG. 5 an example process of online calibration according to one or more aspects.

FIG. 5 is a diagram 500 illustrating an example process of online calibration according to one or more aspects. The first device 502 may implement aspects of the first device 402 in FIG. 4. The second device 504 may implement aspects of the second device 404 in FIG. 4. In a signaling and training process, in each iteration of one or more training iterations, at 520, the first device 502 may transmit a first RS to the second device 504 via a transmit beam $f_i$ of the first device 502 and a receive beam $g_i$ of the second device 504 (i.e., a beamformed transmission and reception). At 522, the second device 504 may transmit a second RS to the first device 502 via a transmit beam $g_i$ of the second device 504 and a receive beam $f_i$ of the first device 502. In other words, the second device 504 may use the same sets of beamforming weights for the receive beam $g_i$ at 520 and the transmit beam $g_i$ at 522. At 524, the first device 502 may transmit a feedback message to the second device 504, where the feedback message may include the symbols associated with the second RS as received at the first device 502.

Thereafter, at 526, the second device 504 may determine (compute) calibration adjustment factors based on the information gathered in the signaling and training process. For example, in particular, the second device 504 may determine calibration adjustment factors based on the first RS received at 520 and the feedback message received at 524. One or more training iterations may be performed as appropriate. In other words, operations 520, 522, and 524 may be repeated for a number of times as appropriate. Thereafter, at 528, the second device 504 may perform a calibrated transmission to the first device 502, where the second device 504 may adjust the TX beamforming weights based on the calibration adjustment factors and the RX beamforming weights.

In some configurations, one or both of the first device 502 and the second device 504 may be capable of measuring/estimating the signal strength but not the phase response (e.g., to reduce device complexity, the hardware that may enable phase response measurement/estimation may not be included). In some configurations, one or both of the first device 502 and the second device 504 may be capable of measuring/estimating the phase response. In one or more configurations, one or both of the first device 502 and the second device 504 may dynamically switch between performing signal strength measurement/estimation and performing phase measurement/estimation.

In different configurations, the number of RSs that may be used in the signaling and training process may be dependent on a number of factors. For example, one of the factors may be whether the online calibration is a one-sided calibration (e.g., the second device may be uncalibrated prior to the online calibration and the first device may be pre-calibrated) or a two-sided calibration (e.g., both the first device and the second device may be uncalibrated prior to the online calibration and both devices may be calibrated based on the online calibration). For example, assuming the first device has M antenna elements and the second device has N antenna elements and assuming that both devices are capable of measuring phase responses, 2MN RSs may be used in the training phase if a two-sided calibration is to be performed. Further, in this configuration, the feedback (overhead) may include MN CIRs. In another example, if a one-sided calibration is to be performed (e.g., the first device may be pre-calibrated and the second device may be uncalibrated prior to the online calibration) with the other assumptions remaining the same, 2N RSs may be used in the training phase with the feedback (overhead) including N CIRs.

Table 2 below may summarize the number of RSs used and the feedback overhead for the online calibration with different configurations.

TABLE 2

Number of RSs and feedback overhead for online calibration

| | One-sided calibration (at the second device) | | Two-sided calibration | |
| --- | --- | --- | --- | --- |
| | Number of RSs | Feedback overhead | Number of RSs | Feedback overhead |
| Both the first device and the second device can make phase measurements | 2N | N | 2MN | MN |
| The second device can make signal strength measurements but not phase measurements; the first device can make phase measurements | 3N − 2 + N = 4N − 2 | N | max ((4N − 2) * M, (4M − 2) * N) | MN |
| The first device can make signal strength measurements but not phase measurements; the second device can make | N + 3N − 2 = 4N − 2 | N | max ((4N − 2) * M, (4M − 2) * N) | MN |

TABLE 2-continued

Number of RSs and feedback overhead for online calibration

| | One-sided calibration (at the second device) | | Two-sided calibration | |
|---|---|---|---|---|
| | Number of RSs | Feedback overhead | Number of RSs | Feedback overhead |
| phase measurements Both the first device and the second device can make signal strength measurements but not phase measurements | 3N − 2 + 3N − 2 = 6N − 4 | N | max ((6N − 2) * M, (6M − 2) * N) | MN |

The above-mentioned direct phase measurement-based phase estimation approach may be described in further detail. It may be assumed that a first wireless device (e.g., a base station (B S)) may have M antennas (or antenna elements) and a second wireless device (e.g., a UE) may have N antennas (or antenna elements). Accordingly, the first wireless device may beamform a scalar symbol s along $f_{BS}$ for the system equation $y=Hf_{BS}s+n$. Further, for optimal beamforming, the second wireless device may attempt to estimate $Hf_{BS}$ (i.e., for a matched filter). In one configuration where the phases may be estimated via direct phase measurement, the first wireless device may use N training symbols $s_j=s$ (j=1, 2, . . . , N) beamformed along $f_{BS}$ to produce $y_j=Hf_{BS}s+n_j$. Subsequently, by using the cross-phase relationships between $\{y_j\}$, the second wireless device may estimate $Hf_{BS}$ as follows:

$$\hat{s}_j = \tilde{g}_j^H y_j = \tilde{g}_j^H H f_{BS} + \tilde{g}_j^H n_j$$

$$\begin{bmatrix} \hat{s}_1 \\ \vdots \\ \hat{s}_{N_r} \end{bmatrix} = \begin{bmatrix} \tilde{g}_1^H \\ \vdots \\ \tilde{g}_{N_r}^H \end{bmatrix} \cdot H f_{BS} + \begin{bmatrix} \tilde{g}_1^H n_1 \\ \vdots \\ \tilde{g}_{N_r}^H n_{N_r} \end{bmatrix}$$

$$\widehat{Hf_{BS}} = \begin{bmatrix} \tilde{g}_1 & \cdots & \tilde{g}_{N_r} \end{bmatrix} \cdot \begin{bmatrix} \hat{s}_1 \\ \vdots \\ \hat{s}_{N_r} \end{bmatrix}$$

As mentioned above, the direct phase measurement-based phase estimation approach may need better or dedicated hardware capabilities at the wireless devices. Such hardware capabilities may not be available because they may be expensive and/or complicated to implement in mmW devices.

In some configurations, one or both of the wireless devices (e.g., the second wireless device such as a UE) may not be capable of performing phase measurement, but may be able to estimate the signal strength (e.g., the RSRP measurement) over each symbol. Accordingly, in some configurations, the phases may be estimated based on signal strength measurements. In particular, let $h=Hf_{BS}=[h_1, h_2, \ldots, h_N]$ and assume high signal-to-noise ratio (SNR) conditions (e.g., s=1) so that the noise term in the channel estimation may be ignored.

In the first step of the signal strength measurement-based phase estimation process, N sampling beams may be used, where each of the sampling beams may be used to perform per-antenna (element) estimation. With $$\tilde{g}_i = \begin{bmatrix} 0, \ldots, 0, \underset{i}{1}, 0, \ldots 0 \end{bmatrix}^T,$$

it may be known that $RSRP_i=|h_i|^2$. To estimate h, the phases of the individual terms ($e^{j\angle h_i}$) may be used. Because the phase of the first antenna (element) may be arbitrarily set to 0, the phases of the (N−1) antennas (or antenna elements) may be used.

In the second step, to estimate the phase of the second antenna (element) (e.g., with respect to the first antenna (element)), the beamforming vector $\hat{g}_1=[1, 1, 0, \ldots, 0]^T$ may be used.

It may be known that $$RSRP_{N+1} = |h_1 + h_2|^2$$
$$= |h_1|^2 + |h_2|^2 + 2\text{Re}(h_1^* h_2)$$
$$= |h_1|^2 + |h_2|^2 + 2|h_1||h_2|\cos(\angle h_2 - \angle h_1)$$
$$= RSRP_1 + RSRP_2 + 2\sqrt{RSRP_1 \cdot RSRP_2} \cdot \cos(\angle h_2 - \angle h_1)$$

Knowledge of the above equation may help to identify $\cos(\angle h_2-\angle h_1)$, but not the value of $\angle h_2-\angle h_1$ because there may be two unique principal values (in the range between −180° and 180°) for $\angle h_2-\angle h_1$ given a $\cos(\angle h_2-\angle h_1)$ value. Therefore, an additional equation may be used to uniquely identify the value of $\angle h_2-\angle h_1$. In particular, $\hat{g}_2=[1, i, 0, \ldots, 0]^T$ may be used and the following equation may be obtained:

$$RSRP_{N+2} = |h_1 + ih_2|^2$$
$$= |h_1|^2 + |h_2|^2 + 2\text{Re}(i \cdot h_1^* h_2)$$
$$= |h_1|^2 + |h_2|^2 + 2|h_1||h_2|\cos\left(\angle h_2 - \angle h_1 + \frac{\pi}{2}\right)$$
$$= RSRP_1 + RSRP_2 - 2\sqrt{RSRP_1 \cdot RSRP_2} \cdot \sin(\angle h_2 - \angle h_1)$$

Accordingly, solving for $RSRP_{N+1}$ and $RSRP_{N+2}$, the value of $\angle h_2-\angle h_1$ may be obtained.

In the third step, the process described in the above steps may be repeated for every $\angle h_i-\angle h_1$. Because two equations may be used for each $\angle h_i-\angle h_1$, the total number of RS s that may be used may be N+2(N−1)=3N−2.

Figure 6:
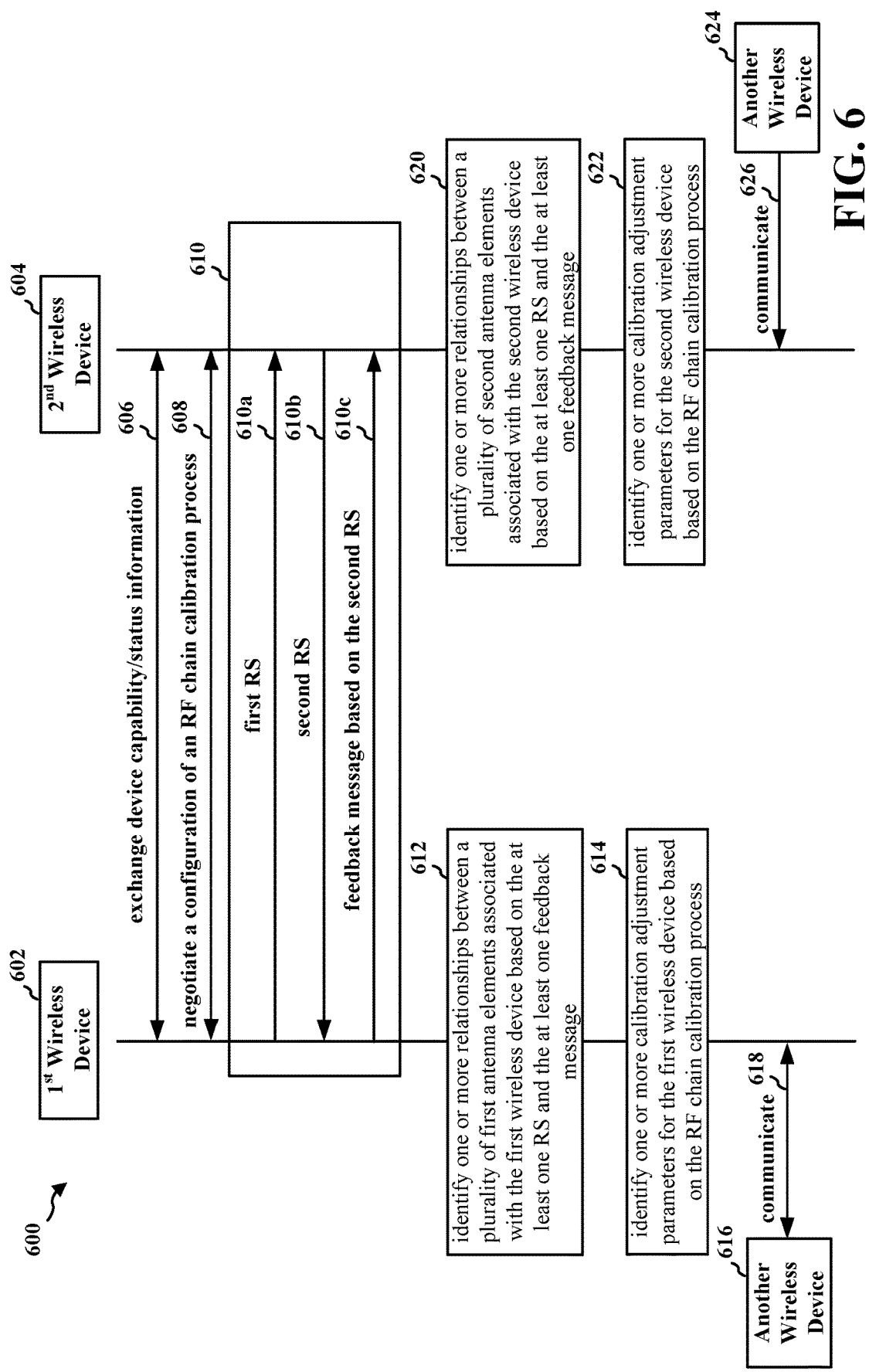
FIG. 6 is a diagram of a communication flow of a method of wireless communication.

FIG. 6 is a diagram of a communication flow 600 of a method of wireless communication. The first wireless device 602 may implement aspects of the first device 402 in FIG. 4 or the first device 502 in FIG. 5. The second wireless device 604 may implement aspects of the second device 404 in FIG. 4 or the second device 504 in FIG. 5. At 606, the first wireless device 602 and the second wireless device 604 may exchange device capability/status information associated with at least one of the first wireless device 602 or the second wireless device 604 with each other.

In one or more configurations, the device capability/status information associated with the at least one of the first wireless device 602 or the second wireless device 604 may include one or more of a number of antenna elements, a signal measurement capability (e.g., whether either of the device is capable of measuring the phase response), or a calibration status (e.g., (pre-)calibrated or uncalibrated).

In one or more configurations, the first wireless device 602 may be capable of signal strength measurement. The second wireless device 604 may be capable of signal strength measurement.

In one or more configurations, the first wireless device 602 may or may not be capable of phase measurement. The first wireless device 602 may be (pre-)calibrated or uncalibrated (prior to the online calibration process). The second wireless device 604 may or may not be capable of phase measurement. The second wireless device 604 may be (pre-)calibrated or uncalibrated (prior to the online calibration process).

At 608, the first wireless device 602 and the second wireless device 604 may negotiate a configuration of an RF chain calibration process with each other. The configuration of the RF chain calibration process may include a number of calibration rounds. Further, the configuration of the RF chain calibration process may be based on the device capability/ status information associated with the at least one of the first wireless device 602 or the second wireless device 604, as exchanged at 606.

In one configuration, the number of calibration rounds may be based on the device capability/status information associated with the at least one of the first wireless device 602 or the second wireless device 604.

At 610, the first wireless device 602 and the second wireless device 604 may exchange, in each calibration round in the number of calibration rounds, at least one RS and at least one feedback message with each other based on the configuration of the RF chain calibration process. In some configurations, 610 may include 610a, 610b, and 610c.

At 610a, the first wireless device 602 may transmit, in each calibration round in the number of calibration rounds, a first RS to the second wireless device 604.

At 610b, the second wireless device 604 may transmit, in each calibration round in the number of calibration rounds, a second RS to the first wireless device 602. The first RS and the second RS may be associated with a same set of beamforming weights at the first wireless device 602 and the second wireless device 604. In different configurations, any suitable RS may be used as the first RS and/or the second RS.

At 610c, the first wireless device 602 may transmit, in each calibration round in the number of calibration rounds, a feedback message (e.g., the symbols associated with the second RS as received at the first wireless device 602) to the second wireless device 604 based on the second RS.

At 620, the second wireless device 604 may identify one or more relationships between a plurality of second antenna elements associated with the second wireless device 604 based on the at least one RS and the at least one feedback message. In one example, the second wireless device 604 may identify one or more relationships between a plurality of second antenna elements associated with the second wireless device 604 based on the first RS received at 610a and the feedback message received 610c.

At 622, the second wireless device 604 may identify one or more calibration adjustment parameters for the second wireless device 604 based on the RF chain calibration process. The one or more calibration adjustment parameters for the second wireless device 604 may be based on the one or more relationships between the plurality of second antenna elements associated with the second wireless device 604, as identified at 620.

In one configuration, the one or more calibration adjustment parameters identified at 622 may be associated with one or more of an amplifier (e.g., a variable gain amplifier, a power amplifier, or a low-noise amplifier), a mixer, a coupler, a filter, a DAC, or an ADC.

At 626, the second wireless device 604 may communicate with another wireless device 624 (which may or may not be the first wireless device 602) based on the one or more calibration adjustment parameters identified at 622.

In some configurations, if a two-sided calibration is performed, operations 612, 614, and 618 may be performed. At 612, the first wireless device 602 may identify one or more relationships between a plurality of first antenna elements associated with the first wireless device 602 based on the at least one RS and the at least one feedback message.

At 614, the first wireless device 602 may identify one or more calibration adjustment parameters for the first wireless device 602 based on the RF chain calibration process. The one or more calibration adjustment parameters for the first wireless device 602 may be based on the one or more relationships between the plurality of first antenna elements associated with the first wireless device 602, as identified at 612.

In one configuration, the one or more calibration adjustment parameters identified at 614 may be associated with one or more of an amplifier, a mixer, a coupler, a filter, a DAC, or an ADC.

At 618, the first wireless device 602 may communicate with another wireless device 616 (which may or may not be the second wireless device 604) based on the one or more calibration adjustment parameters identified at 614.

In one configuration, a link between the first wireless device 602 and the second wireless device 604 may be an access link (e.g., a Uu link) or a sidelink.

In some configurations, a number of iterations of the online calibration process may be performed to improve the SNR in the estimation of calibration adjustment parameters.

Figure 7:
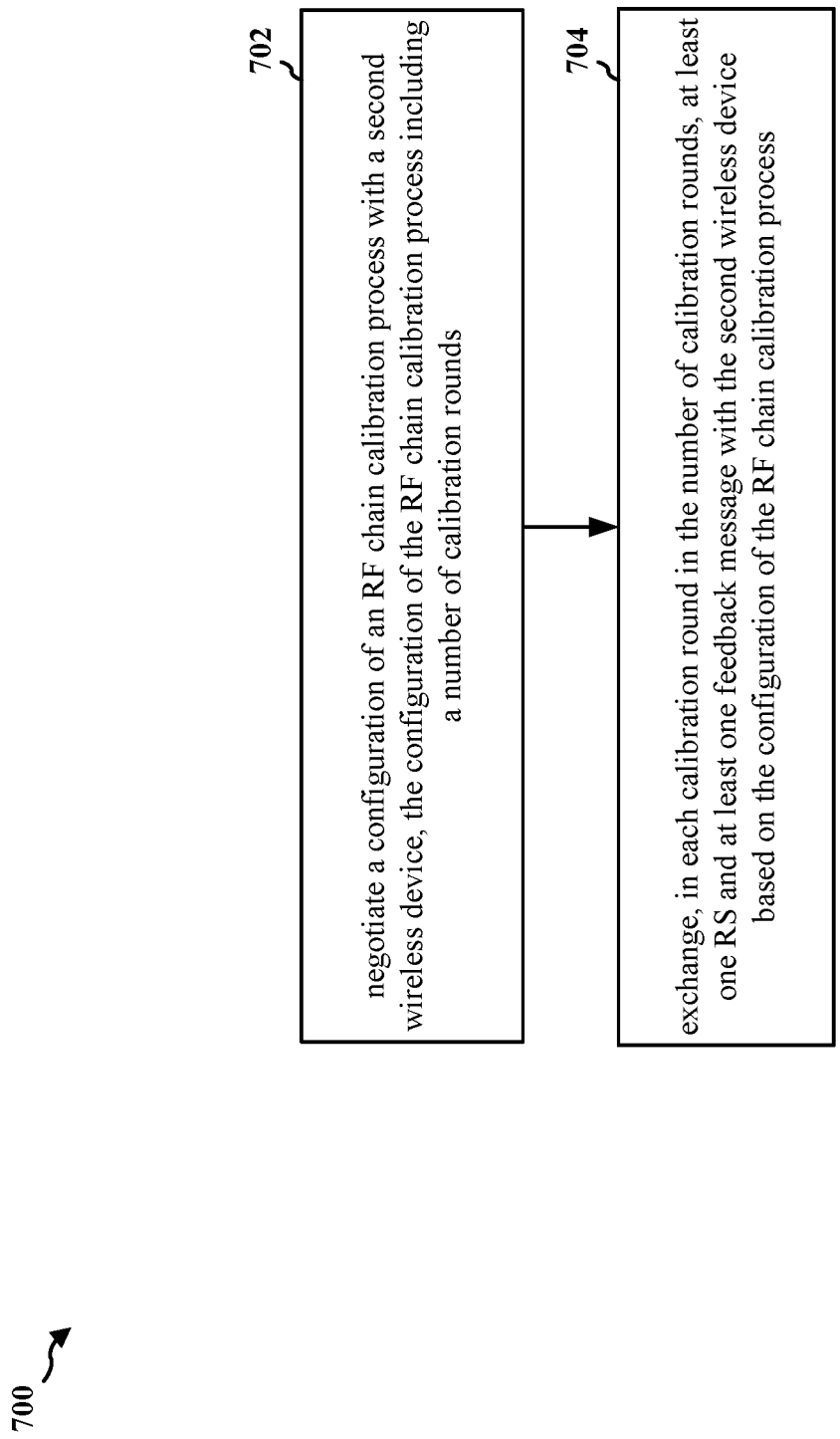
FIG. 7 is a flowchart of a method of wireless communication.

FIG. 7 is a flowchart 700 of a method of wireless communication. The method may be performed by a first wireless device (e.g., the network node 102/310; the UE 104/350; the first wireless device 602; the apparatus 1102). At 702, the first wireless device may negotiate a configuration of an RF chain calibration process with a second wireless device. The configuration of the RF chain calibration process may include a number of calibration rounds. For example, 702 may be performed by the component 199 in FIG. 11. Referring to FIG. 6, at 608, the first wireless device 602 may negotiate a configuration of an RF chain calibration process with a second wireless device 604.

At 704, the first wireless device may exchange, in each calibration round in the number of calibration rounds, at least one RS and at least one feedback message with the second wireless device based on the configuration of the RF chain calibration process. For example, 704 may be performed by the component 199 in FIG. 11. Referring to FIG. 6, at 610, the first wireless device 602 may exchange, in each calibration round in the number of calibration rounds, at least one RS and at least one feedback message with the second wireless device 604 based on the configuration of the RF chain calibration process.

Figure 8:
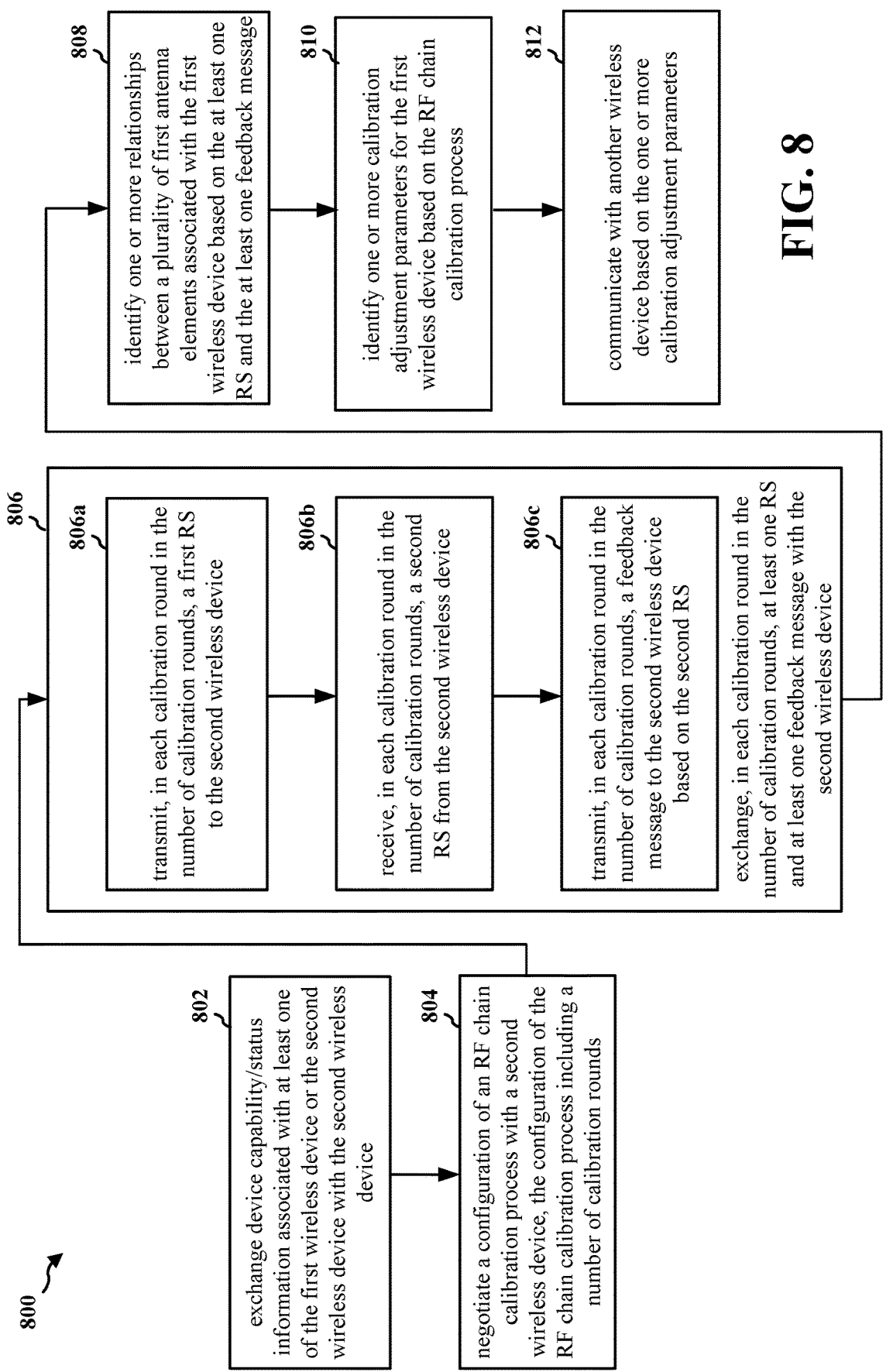
FIG. 8 is a flowchart of a method of wireless communication.

FIG. 8 is a flowchart 800 of a method of wireless communication. The method may be performed by a first wireless device (e.g., the network node 102/310; the UE 104/350; the first wireless device 602; the apparatus 1102). At 804, the first wireless device may negotiate a configuration of an RF chain calibration process with a second wireless device. The configuration of the RF chain calibration process may include a number of calibration rounds. For example, 804 may be performed by the component 199 in FIG. 11. Referring to FIG. 6, at 608, the first wireless device 602 may negotiate a configuration of an RF chain calibration process with a second wireless device 604.

At 806, the first wireless device may exchange, in each calibration round in the number of calibration rounds, at least one RS and at least one feedback message with the second wireless device based on the configuration of the RF chain calibration process. For example, 806 may be performed by the component 199 in FIG. 11. Referring to FIG. 6, at 610, the first wireless device 602 may exchange, in each calibration round in the number of calibration rounds, at least one RS and at least one feedback message with the second wireless device 604 based on the configuration of the RF chain calibration process.

In one configuration, at 810, the first wireless device may identify one or more calibration adjustment parameters for the first wireless device based on the RF chain calibration process. For example, 810 may be performed by the component 199 in FIG. 11. Referring to FIG. 6, at 614, the first wireless device 602 may identify one or more calibration adjustment parameters for the first wireless device 602 based on the RF chain calibration process.

At 812, the first wireless device may communicate with another wireless device based on the one or more calibration adjustment parameters. For example, 812 may be performed by the component 199 in FIG. 11. Referring to FIG. 6, at 618, the first wireless device 602 may communicate with another wireless device 616 based on the one or more calibration adjustment parameters.

In one configuration, at 808, the first wireless device may identify one or more relationships between a plurality of first antenna elements associated with the first wireless device based on the at least one RS and the at least one feedback message. The one or more calibration adjustment parameters for the first wireless device may be based on the one or more relationships between the plurality of first antenna elements associated with the first wireless device. For example, 808 may be performed by the component 199 in FIG. 11. Referring to FIG. 6, at 612, the first wireless device 602 may identify one or more relationships between a plurality of first antenna elements associated with the first wireless device 602 based on the at least one RS and the at least one feedback message.

In one configuration, the one or more calibration adjustment parameters may be associated with one or more of an amplifier, a mixer, a coupler, a filter, a DAC, or an ADC.

In one configuration, to exchange, at 806, in each calibration round in the number of calibration rounds, the at least one RS and the at least one feedback message with the second wireless device, at 806a, the first wireless device may transmit, in each calibration round in the number of calibration rounds, a first RS to the second wireless device. For example, 806a may be performed by the component 199 in FIG. 11. Referring to FIG. 6, at 610a, the first wireless device 602 may transmit, in each calibration round in the number of calibration rounds, a first RS to the second wireless device 604.

At 806b, the first wireless device may receive, in each calibration round in the number of calibration rounds, a second RS from the second wireless device. The first RS and the second RS may be associated with a same set of beamforming weights at the first wireless device and the second wireless device. For example, 806b may be performed by the component 199 in FIG. 11. Referring to FIG. 6, at 610b, the first wireless device 602 may receive, in each calibration round in the number of calibration rounds, a second RS from the second wireless device 604.

At 806c, the first wireless device may transmit, in each calibration round in the number of calibration rounds, a feedback message to the second wireless device based on the second RS. For example, 806c may be performed by the component 199 in FIG. 11. Referring to FIG. 6, at 610c, the first wireless device 602 may transmit, in each calibration round in the number of calibration rounds, a feedback message to the second wireless device 604 based on the second RS.

In one configuration, at 802, the first wireless device may exchange device capability/status information associated with at least one of the first wireless device or the second wireless device with the second wireless device. The configuration of the RF chain calibration process may be based on the device capability/status information associated with the at least one of the first wireless device or the second wireless device. For example, 802 may be performed by the component 199 in FIG. 11. Referring to FIG. 6, at 606, the first wireless device 602 may exchange device capability/status information associated with at least one of the first wireless device 602 or the second wireless device 604 with the second wireless device 604.

In one configuration, referring to FIG. 6, the device capability/status information associated with the at least one of the first wireless device 602 or the second wireless device 604 may include one or more of a number of antenna elements, a signal measurement capability, or a calibration status.

In one configuration, referring to FIG. 6, the first wireless device 602 may be capable of signal strength measurement. The second wireless device 604 may be capable of signal strength measurement.

In one configuration, referring to FIG. 6, the first wireless device 602 may or may not be capable of phase measurement. The first wireless device 602 may be calibrated or uncalibrated. The second wireless device 604 may or may not be capable of phase measurement. The second wireless device 604 may be calibrated or uncalibrated.

In one configuration, referring to FIG. 6, the number of calibration rounds may be based on the device capability/status information associated with the at least one of the first wireless device 602 or the second wireless device 604.

In one configuration, referring to FIG. 6, a link between the first wireless device 602 and the second wireless device 604 may be an access link or a sidelink.

Figure 9:
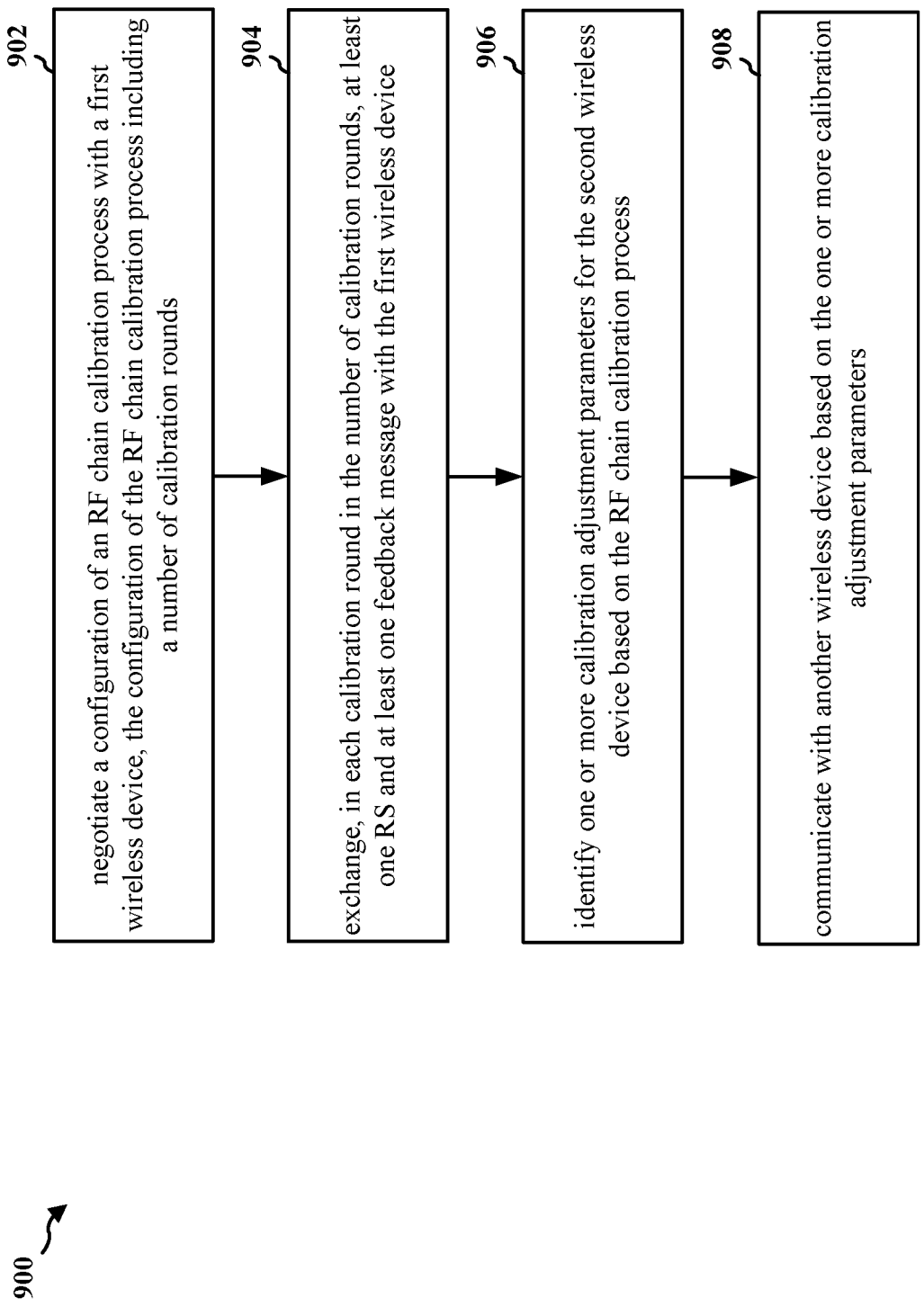
FIG. 9 is a flowchart of a method of wireless communication.

FIG. 9 is a flowchart 900 of a method of wireless communication. The method may be performed by a second wireless device (e.g., the UE 104/350; the network node 102/310; the second wireless device 604; the apparatus 1104). At 902, the second wireless device may negotiate a configuration of an RF chain calibration process with a first wireless device. The configuration of the RF chain calibration process may include a number of calibration rounds. For example, 902 may be performed by the component 198 in FIG. 11. Referring to FIG. 6, at 608, the second wireless device 604 may negotiate a configuration of an RF chain calibration process with a first wireless device 602.

At 904, the second wireless device may exchange, in each calibration round in the number of calibration rounds, at least one RS and at least one feedback message with the first wireless device. For example, 904 may be performed by the component 198 in FIG. 11. Referring to FIG. 6, at 610, the second wireless device 604 may exchange, in each calibration round in the number of calibration rounds, at least one RS and at least one feedback message with the first wireless device 602.

At 906, the second wireless device may identify one or more calibration adjustment parameters for the second wireless device based on the RF chain calibration process. For example, 906 may be performed by the component 198 in FIG. 11. Referring to FIG. 6, at 622, the second wireless device 604 may identify one or more calibration adjustment parameters for the second wireless device 604 based on the RF chain calibration process.

At 908, the second wireless device may communicate with another wireless device based on the one or more calibration adjustment parameters. For example, 908 may be performed by the component 198 in FIG. 11. Referring to FIG. 6, at 626, the second wireless device 604 may communicate with another wireless device 624 based on the one or more calibration adjustment parameters.

Figure 10:
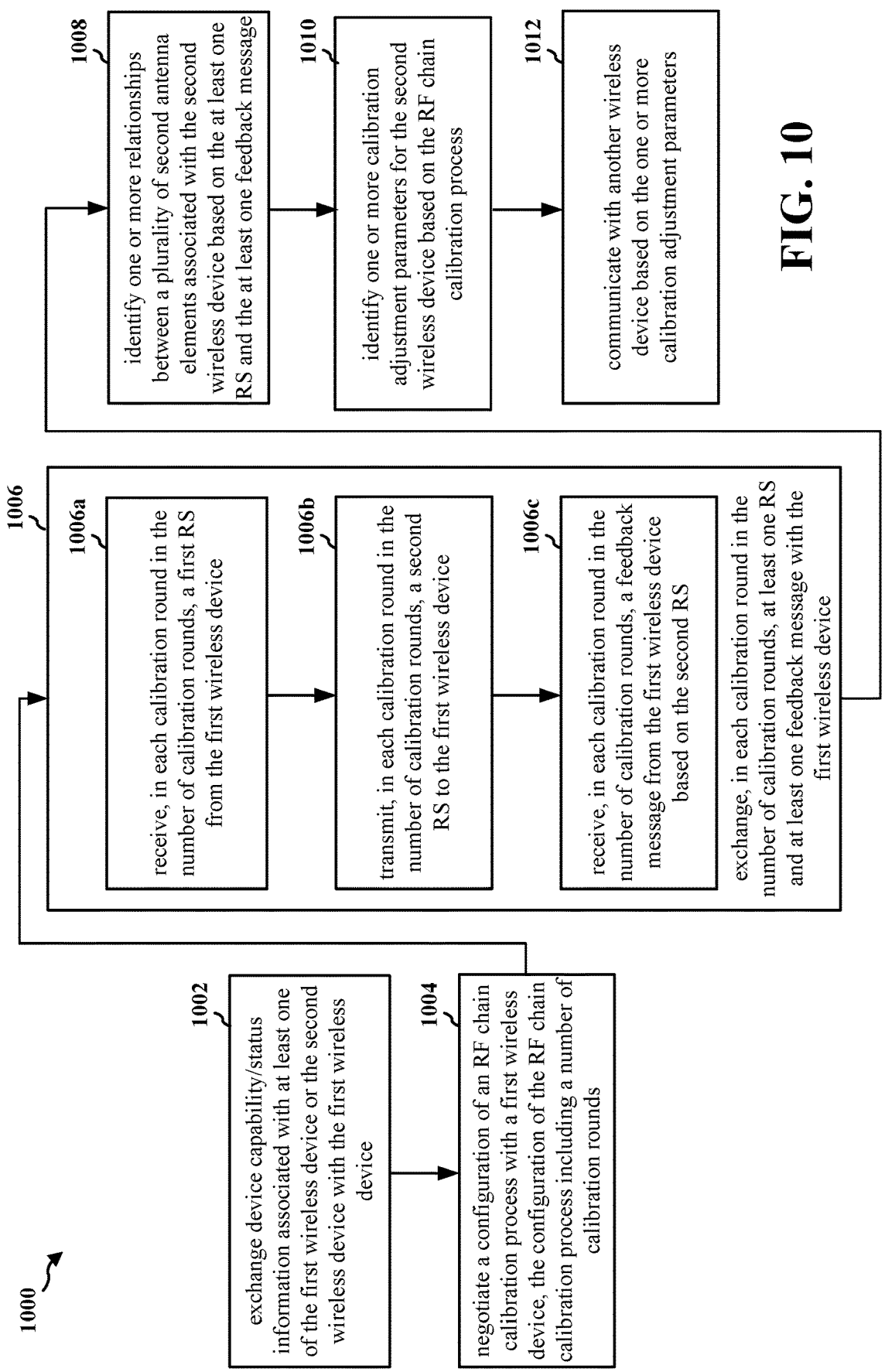
FIG. 10 is a flowchart of a method of wireless communication.

FIG. 10 is a flowchart 1000 of a method of wireless communication. The method may be performed by a second wireless device (e.g., the UE 104/350; the network node 102/310; the second wireless device 604; the apparatus 1104). At 1004, the second wireless device may negotiate a configuration of an RF chain calibration process with a first wireless device. The configuration of the RF chain calibration process may include a number of calibration rounds. For example, 1004 may be performed by the component 198 in FIG. 11. Referring to FIG. 6, at 608, the second wireless device 604 may negotiate a configuration of an RF chain calibration process with a first wireless device 602.

At 1006, the second wireless device may exchange, in each calibration round in the number of calibration rounds, at least one RS and at least one feedback message with the first wireless device. For example, 1006 may be performed by the component 198 in FIG. 11. Referring to FIG. 6, at 610, the second wireless device 604 may exchange, in each calibration round in the number of calibration rounds, at least one RS and at least one feedback message with the first wireless device 602.

At 1010, the second wireless device may identify one or more calibration adjustment parameters for the second wireless device based on the RF chain calibration process. For example, 1010 may be performed by the component 198 in FIG. 11. Referring to FIG. 6, at 622, the second wireless device 604 may identify one or more calibration adjustment parameters for the second wireless device 604 based on the RF chain calibration process.

At 1012, the second wireless device may communicate with another wireless device based on the one or more calibration adjustment parameters. For example, 1012 may be performed by the component 198 in FIG. 11. Referring to FIG. 6, at 626, the second wireless device 604 may communicate with another wireless device 624 based on the one or more calibration adjustment parameters.

In one configuration, at 1008, the second wireless device may identify one or more relationships between a plurality of second antenna elements associated with the second wireless device based on the at least one RS and the at least one feedback message. The one or more calibration adjustment parameters for the second wireless device may be based on the one or more relationships between the plurality of second antenna elements associated with the second wireless device. For example, 1008 may be performed by the component 198 in FIG. 11. Referring to FIG. 6, at 620, the second wireless device 604 may identify one or more relationships between a plurality of second antenna elements associated with the second wireless device 604 based on the at least one RS and the at least one feedback message.

In one configuration, the one or more calibration adjustment parameters may be associated with one or more of an amplifier, a mixer, a coupler, a filter, or a DAC, or an ADC.

In one configuration, to exchange, at 1006, in each calibration round in the number of calibration rounds, the at least one RS and the at least one feedback message with the first wireless device, at 1006*a*, the second wireless device may receive, in each calibration round in the number of calibration rounds, a first RS from the first wireless device. For example, 1006*a* may be performed by the component 198 in FIG. 11. Referring to FIG. 6, at 610*a*, the second wireless device 604 may receive, in each calibration round in the number of calibration rounds, a first RS from the first wireless device 602.

At 1006*b*, the second wireless device may transmit, in each calibration round in the number of calibration rounds, a second RS to the first wireless device. The first RS and the second RS may be associated with a same set of beamforming weights at the first wireless device and the second wireless device. For example, 1006*b* may be performed by the component 198 in FIG. 11. Referring to FIG. 6, at 610*b*, the second wireless device 604 may transmit, in each calibration round in the number of calibration rounds, a second RS to the first wireless device 602.

At 1006*c*, the second wireless device may receive, in each calibration round in the number of calibration rounds, a feedback message from the first wireless device based on the second RS. The one or more calibration adjustment parameters may be identified, at 1010, for the second wireless device based on the first RS and the feedback message. For example, 1006*c* may be performed by the component 198 in FIG. 11. Referring to FIG. 6, at 610*c*, the second wireless device 604 may receive, in each calibration round in the number of calibration rounds, a feedback message from the first wireless device 602 based on the second RS.

In one configuration, at 1002, the second wireless device may exchange device capability/status information associated with at least one of the first wireless device or the second wireless device with the first wireless device. The configuration of the RF chain calibration process may be based on the device capability/status information associated with the at least one of the first wireless device or the second wireless device. For example, 1002 may be performed by the component 198 in FIG. 11. Referring to FIG. 6, at 606, the second wireless device 604 may exchange device capability/status information associated with at least one of the first wireless device 602 or the second wireless device 604 with the first wireless device 602.

In one configuration, referring to FIG. 6, the device capability/status information associated with the at least one of the first wireless device 602 or the second wireless device 604 may include one or more of a number of antenna elements, a signal measurement capability, or a calibration status.

In one configuration, referring to FIG. 6, the first wireless device 602 may be capable of signal strength measurement. The second wireless device 604 may be capable of signal strength measurement.

In one configuration, referring to FIG. 6, the first wireless device 602 may or may not be capable of phase measurement. The first wireless device 602 may be calibrated or uncalibrated. The second wireless device 604 may or may not be capable of phase measurement. The second wireless device 604 may be calibrated or uncalibrated.

In one configuration, referring to FIG. 6, the number of calibration rounds may be based on the device capability/status information associated with the at least one of the first wireless device 602 or the second wireless device 604.

In one configuration, referring to FIG. 6, a link between the first wireless device 602 and the second wireless device 604 may be an access link or a sidelink.

Figure 11:
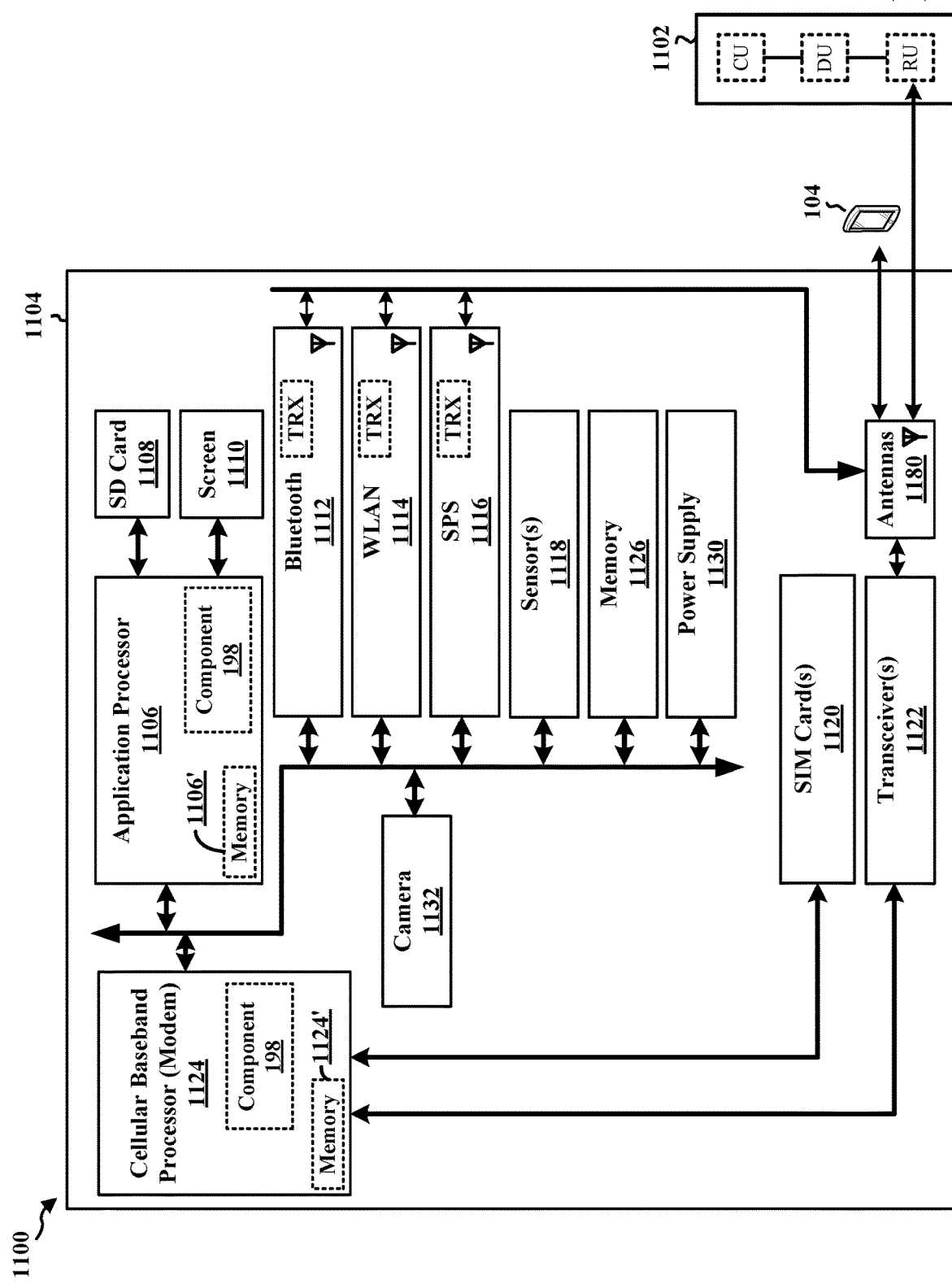
FIG. 11 is a diagram illustrating an example of a hardware implementation for an example apparatus and/or network entity.

FIG. 11 is a diagram 1100 illustrating an example of a hardware implementation for an apparatus 1104. The apparatus 1104 may be a UE, a component of a UE, or may implement UE functionality. In some configurations, the apparatus 1104 may also be a network node. In some aspects, the apparatus 1104 may include a cellular baseband processor 1124 (also referred to as a modem) coupled to one or more transceivers 1122 (e.g., cellular RF transceiver). The cellular baseband processor 1124 may include on-chip memory 1124'. In some aspects, the apparatus 1104 may further include one or more subscriber identity modules (SIM) cards 1120 and an application processor 1106 coupled to a secure digital (SD) card 1108 and a screen 1110. The application processor 1106 may include on-chip memory 1106'. In some aspects, the apparatus 1104 may further include a Bluetooth module 1112, a WLAN module 1114, an SPS module 1116 (e.g., GNSS module), one or more sensor modules 1118 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1126, a power supply 1130, and/or a camera 1132. The Bluetooth module 1112, the WLAN module 1114, and the SPS module 1116 may include an on-chip transceiver (TRX) (or in some cases, just a receiver (RX)). The Bluetooth module 1112, the WLAN module 1114, and the SPS module 1116 may include their own dedicated antennas and/or utilize the antennas 1180 for communication. The cellular baseband processor 1124 communicates through the transceiver(s) 1122 via one or more antennas 1180 with the UE 104 and/or with an RU associated with a network entity 1102. The cellular baseband processor 1124 and the application processor 1106 may each include a computer-readable medium/memory 1124', 1106', respectively. The additional memory modules 1126 may also be considered a computer-readable medium/memory. Each computer-readable medium/memory 1124', 1106', 1126 may be non-transitory. The cellular baseband processor 1124 and the application processor 1106 are each responsible for general processing, including the execution of software stored on the computer-readable medium/memory. The software, when executed by the cellular baseband processor 1124/application processor 1106, causes the cellular baseband processor 1124/application processor 1106 to perform the various functions described supra. The computer-readable medium/memory may also be used for storing data that is manipulated by the cellular baseband processor 1124/application processor 1106 when executing software. The cellular baseband processor 1124/application processor 1106 may be a component of the UE 350 and may include the memory 360 and/or at least one of the TX processor 368, the RX processor 356, and the controller/processor 359. In one configuration, the apparatus 1104 may be a processor chip (modem and/or application) and include just the cellular baseband processor 1124 and/or the application processor 1106, and in another configuration, the apparatus 1104 may be the entire UE (e.g., see 350 of FIG. 3) and include the additional modules of the apparatus 1104.

As discussed supra, the component 198 is configured to negotiate a configuration of an RF chain calibration process with a first wireless device. The configuration of the RF chain calibration process may include a number of calibration rounds. The component 198 may be configured to exchange, in each calibration round in the number of calibration rounds, at least one RS and at least one feedback message with the first wireless device. The component 198 may be configured to identify one or more calibration adjustment parameters for the second wireless device based on the RF chain calibration process. The component 198 may be configured to communicate with another wireless device based on the one or more calibration adjustment parameters. The component 198 may be within the cellular baseband processor 1124, the application processor 1106, or both the cellular baseband processor 1124 and the application processor 1106. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1104 may include a variety of components configured for various functions. In one configuration, the apparatus 1104, and in particular the cellular baseband processor 1124 and/or the application processor 1106, includes means for negotiating a configuration of an RF chain calibration process with a first wireless device. The configuration of the RF chain calibration process may include a number of calibration rounds. The apparatus 1104, and in particular the cellular baseband processor 1124 and/or the application processor 1106, includes means for exchanging, in each calibration round in the number of calibration rounds, at least one RS and at least one feedback message with the first wireless device. The apparatus 1104, and in particular the cellular baseband processor 1124 and/or the application processor 1106, includes means for identifying one or more calibration adjustment parameters for the second wireless device based on the RF chain calibration process. The apparatus 1104, and in particular the cellular baseband processor 1124 and/or the application processor 1106, includes means for communicating with another wireless device based on the one or more calibration adjustment parameters.

In one configuration, the apparatus 1104, and in particular the cellular baseband processor 1124 and/or the application processor 1106, includes means for identifying one or more relationships between a plurality of second antenna elements associated with the second wireless device based on the at least one RS and the at least one feedback message. The one or more calibration adjustment parameters for the second wireless device may be based on the one or more relationships between the plurality of second antenna elements associated with the second wireless device. In one configuration, the one or more calibration adjustment parameters may be associated with one or more of an amplifier, a mixer, a coupler, a filter, or a DAC, or an ADC. In one configuration, the means for exchanging, in each calibration round in the number of calibration rounds, the at least one RS and the at least one feedback message with the first wireless device may be further configured to receive, in each calibration round in the number of calibration rounds, a first RS from the first wireless device; transmit, in each calibration round in the number of calibration rounds, a second RS to the first wireless device, the first RS and the second RS being associated with a same set of beamforming weights at the first wireless device and the second wireless device; and receive, in each calibration round in the number of calibration rounds, a feedback message from the first wireless device based on the second RS. The one or more calibration adjustment parameters may be identified for the second wireless device based on the first RS and the feedback message. In one configuration, the apparatus 1104, and in particular the cellular baseband processor 1124 and/or the application processor 1106, includes means for exchanging device capability/status information associated with at least one of the first wireless device or the second wireless device with the first wireless device. The configuration of the RF chain calibration process may be based on the device capability/status information associated with the at least one of the first wireless device or the second wireless device. In one configuration, the device capability/status information associated with the at least one of the first wireless device or the second wireless device may include one or more of a number of antenna elements, a signal measurement capability, or a calibration status. In one configuration, the first wireless device may be capable of signal strength measurement. The second wireless device may be capable of signal strength measurement. In one configuration, the first wireless device may or may not be capable of phase measurement. The first wireless device may be calibrated or uncalibrated. The second wireless device may or may not be capable of phase measurement. The second wireless device may be calibrated or uncalibrated. In one configuration, the number of calibration rounds may be based on the device capability/status information associated with the at least one of the first wireless device or the second wireless device. In one configuration, a link between the first wireless device and the second wireless device may be an access link or a sidelink.

The means may be the component 198 of the apparatus 1104 configured to perform the functions recited by the means. As described supra, the apparatus 1104 may include the TX processor 368, the RX processor 356, and the controller/processor 359. As such, in one configuration, the means may be the TX processor 368, the RX processor 356, and/or the controller/processor 359 configured to perform the functions recited by the means.

Figure 12:
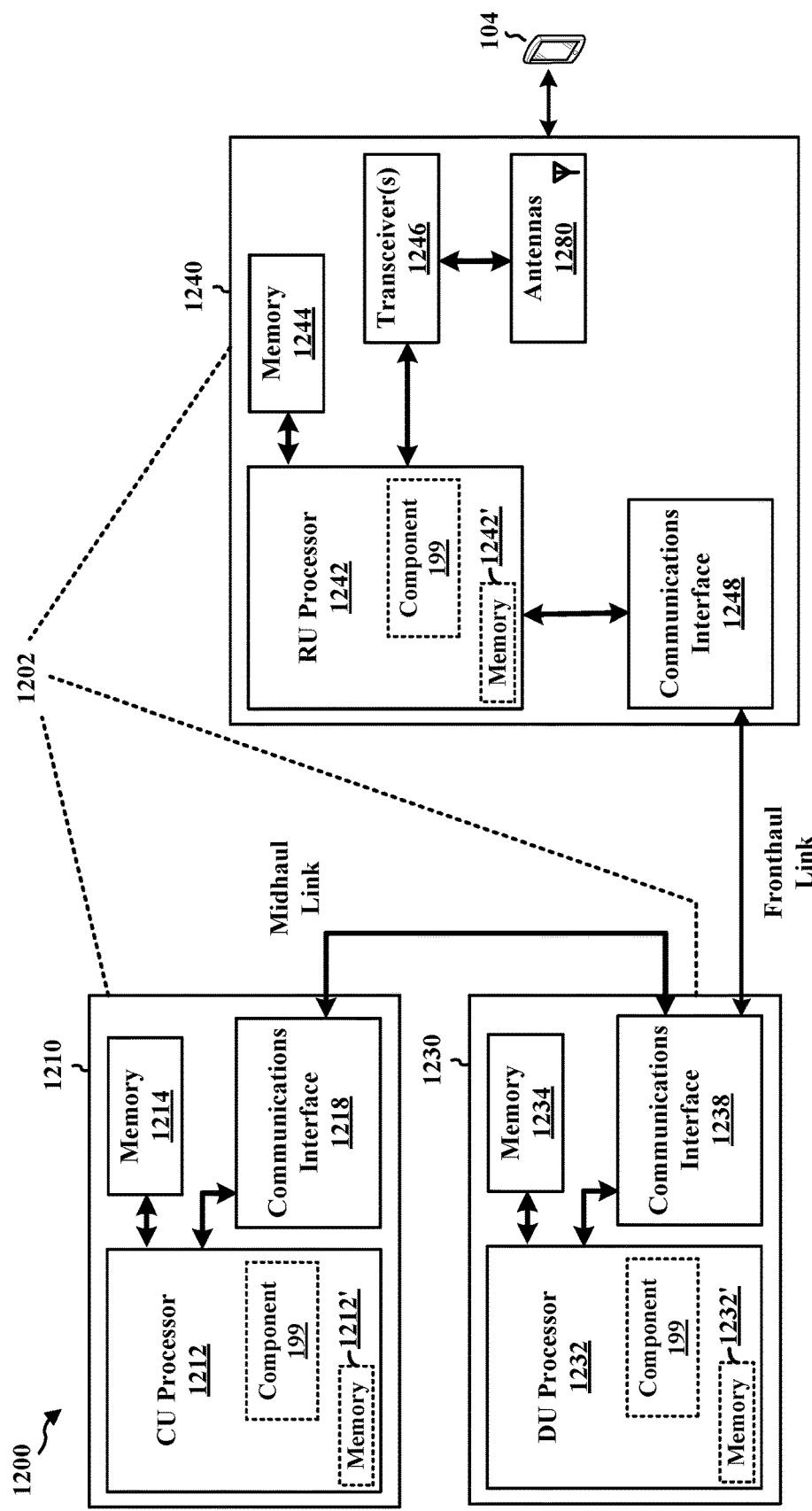
FIG. 12 is a diagram illustrating an example of a hardware implementation for an example network entity.

FIG. 12 is a diagram 1200 illustrating an example of a hardware implementation for a network entity 1202. In some configurations, the apparatus 1202 may also be a UE. The network entity 1202 may be a BS, a component of a BS, or may implement BS functionality. The network entity 1202 may include at least one of a CU 1210, a DU 1230, or an RU 1240. For example, depending on the layer functionality handled by the component 199, the network entity 1202 may include the CU 1210; both the CU 1210 and the DU 1230; each of the CU 1210, the DU 1230, and the RU 1240; the DU 1230; both the DU 1230 and the RU 1240; or the RU 1240. The CU 1210 may include a CU processor 1212. The CU processor 1212 may include on-chip memory 1212'. In some aspects, the CU 1210 may further include additional memory modules 1214 and a communications interface 1218. The CU 1210 communicates with the DU 1230 through a midhaul link, such as an F1 interface. The DU 1230 may include a DU processor 1232. The DU processor 1232 may include on-chip memory 1232'. In some aspects, the DU 1230 may further include additional memory modules 1234 and a communications interface 1238. The DU 1230 communicates with the RU 1240 through a fronthaul link. The RU 1240 may include an RU processor 1242. The RU processor 1242 may include on-chip memory 1242'. In some aspects, the RU 1240 may further include additional memory modules 1244, one or more transceivers 1246, antennas 1280, and a communications interface 1248. The RU 1240 communicates with the UE 104. The on-chip memory 1212', 1232', 1242' and the additional memory modules 1214, 1234, 1244 may each be considered a computer-readable medium/memory. Each computer-readable medium/memory may be non-transitory. Each of the processors 1212, 1232, 1242 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 is configured to negotiate a configuration of an RF chain calibration process with a second wireless device. The configuration of the RF chain calibration process may include a number of calibration rounds. The component 199 may be configured to exchange, in each calibration round in the number of calibration rounds, at least one RS and at least one feedback message with the second wireless device based on the configuration of the RF chain calibration process. The component 199 may be within one or more processors of one or more of the CU 1210, DU 1230, and the RU 1240. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1202 may include a variety of components configured for various functions. In one configuration, the network entity 1202 includes means for negotiating a configuration of an RF chain calibration process with a second wireless device. The configuration of the RF chain calibration process may include a number of calibration rounds. The network entity 1202 includes means for exchanging, in each calibration round in the number of calibration rounds, at least one RS and at least one feedback message with the second wireless device based on the configuration of the RF chain calibration process.

In one configuration, the network entity 1202 includes means for identifying one or more calibration adjustment parameters for the first wireless device based on the RF chain calibration process. The network entity 1202 includes means for communicating with another wireless device based on the one or more calibration adjustment parameters. In one configuration, the network entity 1202 includes means for identifying one or more relationships between a plurality of first antenna elements associated with the first wireless device based on the at least one RS and the at least one feedback message. The one or more calibration adjustment parameters for the first wireless device may be based on the one or more relationships between the plurality of first antenna elements associated with the first wireless device. In one configuration, the one or more calibration adjustment parameters may be associated with one or more of an amplifier, a mixer, a coupler, a filter, a DAC, or an ADC. In one configuration, the means for exchanging, in each calibration round in the number of calibration rounds, the at least one RS and the at least one feedback message with the second wireless device may be further configured to: transmit, in each calibration round in the number of calibration rounds, a first RS to the second wireless device; receive, in each calibration round in the number of calibration rounds, a second RS from the second wireless device, the first RS and the second RS being associated with a same set of beamforming weights at the first wireless device and the second wireless device; and transmit, in each calibration round in the number of calibration rounds, a feedback message to the second wireless device based on the second RS. In one configuration, the network entity 1202 includes means for exchanging device capability/status information associated with at least one of the first wireless device or the second wireless device with the second wireless device. The configuration of the RF chain calibration process may be based on the device capability/status information associated with the at least one of the first wireless device or the second wireless device. In one configuration, the device capability/status information associated with the at least one of the first wireless device or the second wireless device may include one or more of a number of antenna elements, a signal measurement capability, or a calibration status. In one configuration, the first wireless device may be capable of signal strength measurement. The second wireless device may be capable of signal strength measurement. In one configuration, the first wireless device may or may not be capable of phase measurement. The first wireless device may be calibrated or uncalibrated. The second wireless device may or may not be capable of phase measurement. The second wireless device may be calibrated or uncalibrated. In one configuration, the number of calibration rounds may be based on the device capability/status information associated with the at least one of the first wireless device or the second wireless device. In one configuration, a link between the first wireless device and the second wireless device may be an access link or a sidelink.

The means may be the component 199 of the network entity 1202 configured to perform the functions recited by the means. As described supra, the network entity 1202 may include the TX processor 316, the RX processor 370, and the controller/processor 375. As such, in one configuration, the means may be the TX processor 316, the RX processor 370, and/or the controller/processor 375 configured to perform the functions recited by the means.

Referring back to FIGS. 4-12, a first wireless device and a second device may negotiate a configuration of an RF chain calibration process with each other. The configuration of the RF chain calibration process may include a number of calibration rounds. The second wireless device may exchange, in each calibration round in the number of calibration rounds, at least one RS and at least one feedback message with the first wireless device. The second wireless device may identify one or more calibration adjustment parameters for the second wireless device based on the RF chain calibration process. The second wireless device may communicate with another wireless device based on the one or more calibration adjustment parameters. Accordingly, accurate online calibration may be performed for individual devices in the mission mode to support the performance of beamformed transmissions.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device, including negotiate a configuration of an RF chain calibration process with a second wireless device, the configuration of the RF chain calibration process including a number of calibration rounds; and exchange, in each calibration round in the number of calibration rounds, at least one RS and at least one feedback message with the second wireless device based on the configuration of the RF chain calibration process.

Aspect 2 is the method of aspect 1, further including: identifying one or more calibration adjustment parameters for the first wireless device based on the RF chain calibration process; and communicating with another wireless device based on the one or more calibration adjustment parameters.

Aspect 3 is the method of aspect 2, further including: identifying one or more relationships between a plurality of first antenna elements associated with the first wireless device based on the at least one RS and the at least one feedback message, where the one or more calibration adjustment parameters for the first wireless device are based on the one or more relationships between the plurality of first antenna elements associated with the first wireless device.

Aspect 4 is the method of any of aspects 2 and 3, where the one or more calibration adjustment parameters are associated with one or more of an amplifier, a mixer, a coupler, a filter, a DAC, or an ADC.

Aspect 5 is the method of any of aspects 1 to 4, where to exchange, in each calibration round in the number of calibration rounds, the at least one RS and the at least one feedback message with the second wireless device, the method further includes: transmitting, in each calibration round in the number of calibration rounds, a first RS to the second wireless device; receiving, in each calibration round in the number of calibration rounds, a second RS from the second wireless device, the first RS and the second RS being associated with a same set of beamforming weights at the first wireless device and the second wireless device; and transmitting, in each calibration round in the number of calibration rounds, a feedback message to the second wireless device based on the second RS.

Aspect 6 is the method of any of aspects 1 to 5, further including: exchanging device capability/status information associated with at least one of the first wireless device or the second wireless device with the second wireless device, where the configuration of the RF chain calibration process is based on the device capability/status information associated with the at least one of the first wireless device or the second wireless device.

Aspect 7 is the method of aspect 6, where the device capability/status information associated with the at least one of the first wireless device or the second wireless device includes one or more of a number of antenna elements, a signal measurement capability, or a calibration status.

Aspect 8 is the method of aspect 7, where the first wireless device is capable of signal strength measurement, and the second wireless device is capable of signal strength measurement.

Aspect 9 is the method of any of aspects 7 and 8, where the first wireless device is or is not capable of phase measurement, the first wireless device is calibrated or uncalibrated, the second wireless device is or is not capable of phase measurement, and the second wireless device is calibrated or uncalibrated.

Aspect 10 is the method of any of aspects 6 to 9, where the number of calibration rounds is based on the device capability/status information associated with the at least one of the first wireless device or the second wireless device.

Aspect 11 is the method of any of aspects 1 to 10, where a link between the first wireless device and the second wireless device is an access link or a sidelink.

Aspect 12 is a method of wireless communication at a second wireless device, including negotiate a configuration of an RF chain calibration process with a first wireless device, the configuration of the RF chain calibration process including a number of calibration rounds; exchange, in each calibration round in the number of calibration rounds, at least one RS and at least one feedback message with the first wireless device; identify one or more calibration adjustment parameters for the second wireless device based on the RF chain calibration process; and communicate with another wireless device based on the one or more calibration adjustment parameters.

Aspect 13 is the method of aspect 12, further including: identifying one or more relationships between a plurality of second antenna elements associated with the second wireless device based on the at least one RS and the at least one feedback message, where the one or more calibration adjustment parameters for the second wireless device are based on the one or more relationships between the plurality of second antenna elements associated with the second wireless device.

Aspect 14 is the method of any of aspects 12 and 13, where the one or more calibration adjustment parameters are associated with one or more of an amplifier, a mixer, a coupler, a filter, or a DAC, or an ADC.

Aspect 15 is the method of any of aspects 12 to 14, where to exchange, in each calibration round in the number of calibration rounds, the at least one RS and the at least one feedback message with the first wireless device, the method further includes: receiving, in each calibration round in the number of calibration rounds, a first RS from the first wireless device; transmitting, in each calibration round in the number of calibration rounds, a second RS to the first wireless device, the first RS and the second RS being associated with a same set of beamforming weights at the first wireless device and the second wireless device; and receiving, in each calibration round in the number of calibration rounds, a feedback message from the first wireless device based on the second RS, wherein the one or more calibration adjustment parameters are identified for the second wireless device based on the first RS and the feedback message.

Aspect 16 is the method of any of aspects 12 to 15, further including: exchanging device capability/status information associated with at least one of the first wireless device or the second wireless device with the first wireless device, where the configuration of the RF chain calibration process is based on the device capability/status information associated with the at least one of the first wireless device or the second wireless device.

Aspect 17 is the method of aspect 16, where the device capability/status information associated with the at least one of the first wireless device or the second wireless device includes one or more of a number of antenna elements, a signal measurement capability, or a calibration status.

Aspect 18 is the method of aspect 17, where the first wireless device is capable of signal strength measurement, and the second wireless device is capable of signal strength measurement.

Aspect 19 is the method of any of aspects 17 and 18, where the first wireless device is or is not capable of phase measurement, the first wireless device is calibrated or uncalibrated, the second wireless device is or is not capable of phase measurement, and the second wireless device is calibrated or uncalibrated.

Aspect 20 is the method of any of aspects 16 to 19, where the number of calibration rounds is based on the device capability/status information associated with the at least one of the first wireless device or the second wireless device.

Aspect 21 is the method of any of aspects 12 to 20, where a link between the first wireless device and the second wireless device is an access link or a sidelink.

Aspect 22 is an apparatus for wireless communication including at least one processor coupled to a memory and, based at least in part on information stored in the memory, the at least one processor is configured to implement a method as in any of aspects 1 to 21.

Aspect 23 may be combined with aspect 22 and further includes a transceiver coupled to the at least one processor.

Aspect 24 is an apparatus for wireless communication including means for implementing any of aspects 1 to 21.

Aspect 25 is a non-transitory computer-readable storage medium storing computer executable code, where the code when executed by a processor causes the processor to implement any of aspects 1 to 21.

Various aspects have been described herein. These and other aspects are within the scope of the following claims.

What is claimed is:

1. An apparatus for wireless communication at a first wireless device, comprising:
   a memory; and
   at least one processor coupled to the memory and, based at least in part on information stored in the memory, the at least one processor is configured to:
      negotiate a configuration of a radio frequency (RF) chain calibration process with a second wireless device, the configuration of the RF chain calibration process including a number of calibration rounds; and
      exchange, in each calibration round in the number of calibration rounds, at least one reference signal (RS) and at least one feedback message with the second wireless device based on the configuration of the RF chain calibration process.

2. The apparatus of claim 1, the at least one processor being further configured to:
   identify one or more calibration adjustment parameters for the first wireless device based on the RF chain calibration process; and
   communicate with another wireless device based on the one or more calibration adjustment parameters.

3. The apparatus of claim 2, the at least one processor being further configured to:
   identify one or more relationships between a plurality of first antenna elements associated with the first wireless device based on the at least one RS and the at least one feedback message, wherein the one or more calibration adjustment parameters for the first wireless device are based on the one or more relationships between the plurality of first antenna elements associated with the first wireless device.

4. The apparatus of claim 2, wherein the one or more calibration adjustment parameters are associated with one or more of an amplifier, a mixer, a coupler, a filter, a digital-to-analog converter (DAC), or an analog-to-digital converter (ADC).

5. The apparatus of claim 1, wherein to exchange, in each calibration round in the number of calibration rounds, the at least one RS and the at least one feedback message with the second wireless device, the at least one processor is further configured to:
   transmit, in each calibration round in the number of calibration rounds, a first RS to the second wireless device;
   receive, in each calibration round in the number of calibration rounds, a second RS from the second wireless device, the first RS and the second RS being associated with a same set of beamforming weights at the first wireless device and the second wireless device; and
   transmit, in each calibration round in the number of calibration rounds, a feedback message to the second wireless device based on the second RS.

6. The apparatus of claim 1, the at least one processor being further configured to:
   exchange device capability/status information associated with at least one of the first wireless device or the second wireless device with the second wireless device, wherein the configuration of the RF chain calibration process is based on the device capability/status information associated with the at least one of the first wireless device or the second wireless device.

7. The apparatus of claim 6, wherein the device capability/status information associated with the at least one of the first wireless device or the second wireless device comprises one or more of a number of antenna elements, a signal measurement capability, or a calibration status.

8. The apparatus of claim 7, wherein the first wireless device is capable of signal strength measurement, and the second wireless device is capable of signal strength measurement.

9. The apparatus of claim 7, wherein the first wireless device is or is not capable of phase measurement, the first wireless device is calibrated or uncalibrated, the second wireless device is or is not capable of phase measurement, and the second wireless device is calibrated or uncalibrated.

10. The apparatus of claim 6, wherein the number of calibration rounds is based on the device capability/status information associated with the at least one of the first wireless device or the second wireless device.

11. The apparatus of claim 1, wherein a link between the first wireless device and the second wireless device is an access link or a sidelink.

12. The apparatus of claim 1, further comprising a transceiver coupled to the at least one processor.

13. A method of wireless communication at a first wireless device, comprising:
   negotiating a configuration of a radio frequency (RF) chain calibration process with a second wireless device, the configuration of the RF chain calibration process including a number of calibration rounds; and
   exchanging, in each calibration round in the number of calibration rounds, at least one reference signal (RS) and at least one feedback message with the second wireless device based on the configuration of the RF chain calibration process.

14. The method of claim 13, further comprising:
   identifying one or more calibration adjustment parameters for the first wireless device based on the RF chain calibration process; and
   communicating with another wireless device based on the one or more calibration adjustment parameters.

15. The method of claim 14, further comprising:
   identifying one or more relationships between a plurality of first antenna elements associated with the first wireless device based on the at least one RS and the at least one feedback message, wherein the one or more calibration adjustment parameters for the first wireless device are based on the one or more relationships between the plurality of first antenna elements associated with the first wireless device.

16. An apparatus for wireless communication at a second wireless device, comprising:
   a memory; and
   at least one processor coupled to the memory and, based at least in part on information stored in the memory, the at least one processor is configured to:
      negotiate a configuration of a radio frequency (RF) chain calibration process with a first wireless device, the configuration of the RF chain calibration process including a number of calibration rounds;
      exchange, in each calibration round in the number of calibration rounds, at least one reference signal (RS) and at least one feedback message with the first wireless device;

identify one or more calibration adjustment parameters for the second wireless device based on the RF chain calibration process; and communicate with another wireless device based on the one or more calibration adjustment parameters.

17. The apparatus of claim 16, the at least one processor being further configured to:

identify one or more relationships between a plurality of second antenna elements associated with the second wireless device based on the at least one RS and the at least one feedback message, wherein the one or more calibration adjustment parameters for the second wireless device are based on the one or more relationships between the plurality of second antenna elements associated with the second wireless device.

18. The apparatus of claim 16, wherein the one or more calibration adjustment parameters are associated with one or more of an amplifier, a mixer, a coupler, a filter, a digital-to-analog converter (DAC), or an analog-to-digital converter (ADC).

19. The apparatus of claim 16, wherein to exchange, in each calibration round in the number of calibration rounds, the at least one RS and the at least one feedback message with the first wireless device, the at least one processor is further configured to:

receive, in each calibration round in the number of calibration rounds, a first RS from the first wireless device;

transmit, in each calibration round in the number of calibration rounds, a second RS to the first wireless device, the first RS and the second RS being associated with a same set of beamforming weights at the first wireless device and the second wireless device; and receive, in each calibration round in the number of calibration rounds, a feedback message from the first wireless device based on the second RS, wherein the one or more calibration adjustment parameters are identified for the second wireless device based on the first RS and the feedback message.

20. The apparatus of claim 16, the at least one processor being further configured to:

exchange device capability/status information associated with at least one of the first wireless device or the second wireless device with the first wireless device, wherein the configuration of the RF chain calibration process is based on the device capability/status information associated with the at least one of the first wireless device or the second wireless device.

21. The apparatus of claim 20, wherein the device capability/status information associated with the at least one of the first wireless device or the second wireless device comprises one or more of a number of antenna elements, a signal measurement capability, or a calibration status.

22. The apparatus of claim 21, wherein the first wireless device is capable of signal strength measurement, and the second wireless device is capable of signal strength measurement.

23. The apparatus of claim 21, wherein the first wireless device is or is not capable of phase measurement, the first wireless device is calibrated or uncalibrated, the second wireless device is or is not capable of phase measurement, and the second wireless device is calibrated or uncalibrated.

24. The apparatus of claim 20, wherein the number of calibration rounds is based on the device capability/status information associated with the at least one of the first wireless device or the second wireless device.

25. The apparatus of claim 16, wherein a link between the first wireless device and the second wireless device is an access link or a sidelink.

26. The apparatus of claim 16, further comprising a transceiver coupled to the at least one processor.

27. A method of wireless communication at a second wireless device, comprising:

negotiating a configuration of a radio frequency (RF) chain calibration process with a first wireless device, the configuration of the RF chain calibration process including a number of calibration rounds;

exchanging, in each calibration round in the number of calibration rounds, at least one reference signal (RS) and at least one feedback message with the first wireless device;

identifying one or more calibration adjustment parameters for the second wireless device based on the RF chain calibration process; and communicating with another wireless device based on the one or more calibration adjustment parameters.

28. The method of claim 27, further comprising:

identifying one or more relationships between a plurality of second antenna elements associated with the second wireless device based on the at least one RS and the at least one feedback message, wherein the one or more calibration adjustment parameters for the second wireless device are based on the one or more relationships between the plurality of second antenna elements associated with the second wireless device.

29. The method of claim 27, wherein the one or more calibration adjustment parameters are associated with one or more of an amplifier, a mixer, a coupler, a filter, a digital-to-analog converter (DAC), or an analog-to-digital converter (ADC).

30. The method of claim 27, wherein the exchanging, in each calibration round in the number of calibration rounds, the at least one RS and the at least one feedback message with the first wireless device further comprises:

receiving, in each calibration round in the number of calibration rounds, a first RS from the first wireless device;

transmitting, in each calibration round in the number of calibration rounds, a second RS to the first wireless device, the first RS and the second RS being associated with a same set of beamforming weights at the first wireless device and the second wireless device; and receiving, in each calibration round in the number of calibration rounds, a feedback message from the first wireless device based on the second RS, wherein the one or more calibration adjustment parameters are identified for the second wireless device based on the first RS and the feedback message.

* * * * *